(12) United States Patent
Drenzeck et al.

(10) Patent No.: US 11,186,372 B2
(45) Date of Patent: Nov. 30, 2021

(54) TABLE DEVICE

(71) Applicant: RECARO Aircraft Seating GmbH & Co. KG, Schwäbisch Hall (DE)

(72) Inventors: Thomas Drenzeck, Michelfeld (DE); Patrick Dern, Menden (DE); Andreas Erb, Schwäbisch Hall (DE); Oliver Schweizer, Lindenberg (DE); Tim Schreyer, Schwäbisch Hall (DE); Maik Thiele, Heppenheim (DE); Simon Weisenberger, Leutershausen (DE); Michael Müller, Oberrot (DE); Michael Wagner, Schwäbisch Hall (DE); Marcel Fröbel, Untermünkheim (DE); Stefan Lakeit, Königheim (DE); Jan Reichert, Ilsfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 16/634,418

(22) PCT Filed: Jul. 27, 2018

(86) PCT No.: PCT/EP2018/070488
§ 371 (c)(1),
(2) Date: Jan. 27, 2020

(87) PCT Pub. No.: WO2019/020813
PCT Pub. Date: Jan. 31, 2019

(65) Prior Publication Data
US 2020/0172250 A1 Jun. 4, 2020

(30) Foreign Application Priority Data
Jul. 28, 2017 (DE) ...................... 10 2017 117 173.8

(51) Int. Cl.
*B64D 11/06* (2006.01)
*B60N 3/00* (2006.01)

(52) U.S. Cl.
CPC .......... *B64D 11/0638* (2014.12); *B60N 3/004* (2013.01)

(58) Field of Classification Search
CPC ........... A47C 7/70; B60N 3/004; B64D 11/06
(Continued)

(56) References Cited

U.S. PATENT DOCUMENTS 2,098,426 A * 11/1937 McDonald ............ B60N 3/004
297/146
3,615,118 A * 10/1971 Buxton ............. B64D 11/0636
297/188.07

(Continued)

FOREIGN PATENT DOCUMENTS

CA    2989022 A1 *  6/2018  ............ B60N 3/001
CN    200971062 Y    11/2007
(Continued)

OTHER PUBLICATIONS

German Search Report dated Jun. 21, 2018 issued in corresponding DE application No. 10 2017 117 173.8 (with English translation attached).
(Continued)

*Primary Examiner* — Jose V Chen
(74) *Attorney, Agent, or Firm* — Posz Law Group, PLC

(57) ABSTRACT

A table device for a seat, in particular for an aircraft seat, includes a table unit which is configured for being adjustable at least between a use position and a stowage position, and has at least one locking module which has at least one attachment unit which is configured for being at least in part fixedly connected to a seat component, wherein the table unit at least in the stowage position is lockable to the
(Continued)

attachment unit. The locking module has at least two force-fit and/or form-fit elements, by means of which the table unit in a locked state is coupled in a form-fitting and/or force-fitting manner to the attachment unit.

13 Claims, 13 Drawing Sheets

(58) Field of Classification Search
USPC ......... 108/44, 45, 47, 49, 152; 297/146, 147
See application file for complete search history.

(56) References Cited

U.S. PATENT DOCUMENTS

| | | | | |
|---|---|---|---|---|
| 3,773,381 A * | 11/1973 | Brennan | ................... | A47C 7/70 297/167 |
| 3,795,422 A * | 3/1974 | Robinson | ........... | B64D 11/0007 297/146 |
| 4,159,071 A * | 6/1979 | Roca | ........................ | A47C 7/70 108/42 |
| 4,726,621 A * | 2/1988 | Muller | ................... | B61D 33/00 297/146 |
| 6,601,523 B2 * | 8/2003 | Jensen | ................... | B60N 3/004 108/152 |
| 6,758,518 B2 * | 7/2004 | Ingram | ................... | B64D 11/06 297/146 |
| 6,814,404 B2 * | 11/2004 | Jensen | ....................... | A47C 7/38 108/13 |
| 8,091,959 B2 * | 1/2012 | Berger | .................... | B60R 11/00 297/163 |
| 8,702,163 B2 * | 4/2014 | Westerink | .......... | B64D 11/0624 297/163 |
| 8,826,830 B2 * | 9/2014 | Pajic | ................ | B64D 11/00152 108/44 |
| 2002/0066393 A1 * | 6/2002 | Strode | ................ | B64D 11/0015 108/50.11 |
| 2004/0094998 A1 * | 5/2004 | Williamson | ......... | B64D 11/064 297/146 |
| 2012/0091764 A1 * | 4/2012 | Cailleteau | .......... | B64D 11/0636 297/162 |
| 2014/0167457 A1 * | 6/2014 | Schultheis | ......... | B64D 11/0624 297/162 |
| 2015/0158589 A1 * | 6/2015 | Meckes | .............. | B64D 11/0638 297/147 |
| 2016/0039349 A1 * | 2/2016 | Casagrande | ............ | B60R 7/043 248/205.1 |
| 2019/0283881 A1 * | 9/2019 | Colletti | ................... | B60N 3/004 |
| 2019/0308538 A1 * | 10/2019 | Buchanan | ................ | A47B 1/10 |

FOREIGN PATENT DOCUMENTS

| | | | | |
|---|---|---|---|---|
| CN | 203255004 U | | 10/2013 | |
| DE | 202010002082 U1 * | | 6/2011 | ............. B60N 3/004 |
| DE | 202010002083 U1 * | | 6/2011 | ............. B60N 3/004 |
| DE | 102017117173 A1 * | | 1/2019 | ......... B64D 11/0638 |
| EP | 1260433 A2 * | | 11/2002 | ......... B64D 11/0638 |
| EP | 2671467 A2 | | 12/2013 | |
| EP | 2671467 A2 * | | 12/2013 | ............. B60N 3/004 |
| EP | 2708413 A1 | | 3/2014 | |
| EP | 2740664 A2 * | | 6/2014 | ............... E05C 3/14 |
| EP | 2930110 A1 | | 10/2015 | |
| WO | 2016/089759 A1 | | 6/2016 | |
| WO | WO-2016089759 A1 * | | 6/2016 | ......... B64D 11/0638 |
| WO | 2017/003521 A1 | | 1/2017 | |
| WO | 2017/034624 A1 | | 3/2017 | |
| WO | 2017/095477 A1 | | 6/2017 | |
| WO | 2017/147620 A1 | | 8/2017 | |
| WO | WO-2018012134 A1 * | | 1/2018 | ............... A47C 7/62 |
| WO | WO-2018202585 A1 * | | 11/2018 | ............. B60N 3/004 |

OTHER PUBLICATIONS

International Search Report dated Sep. 19, 2018 issued in corresponding International Patent Application No. PCT/EP2018/070488.

International Preliminary Report on Patentability dated Jan. 28, 2020 issued in corresponding International Patent Application No. PCT/EP2017/070488.

* cited by examiner

TABLE DEVICE

CROSS REFERENCE TO RELATED APPLICATIONS

This application is a U.S. national stage application of PCT/EP2018/070488 filed on Jul. 27, 2018, which is based on German Patent Application No. 10 2017 117 173.8 filed on Jul. 28, 2017, the contents of which are incorporated herein by reference.

PRIOR ART

The invention relates to a table device as claimed in the preamble of patent claim 1.

A table device for a seat, in particular for an aircraft seat, having a table unit which is configured for being adjustable at least between a use position and a stowage position, and having at least one locking module which has at least one attachment unit which is configured for being at least in part fixedly connected to a seat component, wherein the table unit at least in the stowage position is lockable to the attachment unit, has already been proposed.

The object of the invention lies in particular in providing a generic device having improved properties in terms of safety and improved locking in the event of a crash. The object is achieved according to the invention by the features of patent claim 1, while advantageous design embodiments and refinements of the invention can be derived from the dependent claims.

ADVANTAGES OF THE INVENTION

The invention proceeds from a table device for a seat, in particular for an aircraft seat, having a table unit which is configured for being adjustable at least between a use position and a stowage position, and having at least one locking module which has at least one attachment unit which is configured for being at least in part fixedly connected to a seat component, wherein the table unit at least in the stowage position is lockable to the attachment unit.

It is proposed that the locking module has at least two force-fit and/or form-fit elements by means of which the table unit in a locked state is coupled in a form-fitting and/or force fitting manner to the attachment unit. An "aircraft seat" herein is in particular to be understood to be a seat which in an aircraft cabin of an aircraft is configured for being installed on a cabin floor and on which a passenger can sit during a flight. The aircraft seat herein has a seat base and a back rest coupled to the seat base, wherein the back rest is preferably pivotably connected to the seat base, on account of which the aircraft seat is preferably able to be moved to various functional positions. A "table unit" herein is in particular to be understood to be a unit implementing at least one table surface which at least in a use position is aligned so as to be at least substantially parallel with an installation plane of the seat, in particular of the aircraft seat, wherein the table surface is provided with a view to items being able to be placed thereon by a passenger. A "use position" herein is in particular to be understood to be a position of the table unit in which the table unit is pivoted away from the seat component and the table surface implemented by the table unit can be utilized for placing items thereon. The use position of the table unit herein is realized as a position in which the table surface of the table unit is aligned so as to be substantially parallel with this installation plane on which the seat is installed. The use position is realized as a position of the table unit in which the table unit is able to be used in an envisaged manner by a passenger. A "stowage position" herein is in particular to be understood to be a position of the table unit in which the table unit is pivoted toward the seat component and is in particular disposed in a space-saving manner on the seat component. The table surface of the table unit herein preferably faces the seat component, in particular the seat component realized as a back rest. The table unit in the stowage position is not able to be used in an envisaged manner by a passenger. A "locking module" herein is in particular to be understood to be a module by way of which the table unit in the stowage position is fixedly disposed on and locked to the seat component. The locking module herein is in particular configured for locking the table unit in the stowage position such that an undesirable release of the table unit from the seat component can be prevented, in particular also in the event of a crash. The locking module in the event of a crash is in particular provided to prevent the table unit lifting from the seat component, in particular when a passenger or a dummy impacts the seat component. The "event of a crash" herein is in particular to be understood to be case of overloading, thus an operating state in which forces act on the aircraft seat that are larger than forces which are created on account of normal stress in a normal flight operation. A "seat component" herein is in particular to be understood to be a component of an aircraft seat such as, in particular, a back rest or part of a fixed structure of the aircraft seat. In principle, it is also conceivable that the seat component is implemented as any other component of an aircraft seat or of an aircraft seat add-on part that is considered expedient by the person skilled in the art, such as for example a console or a cover element. An "attachment unit" herein is in particular to be understood to be a unit to which the table unit for locking in the stowage position is connected in force-fitting and/or form-fitting manner. The "attachment unit being at least in part fixedly connected to the seat component" herein is in particular to be understood that at least part of the attachment unit, preferably the entire attachment unit, in an assembled state is firmly and fixedly connected to the seat component, both in the stowage position as well as in the use position of the table unit. In principle, it is also conceivable that the attachment unit herein is at least in part implemented integrally with the seat component. A "force-fit and/or form-fit element" herein is in particular to be understood to be an element which is configured for being connected in a force-fitting and/or form-fitting manner to a correspondingly implemented force-fit and/or form-fit element, so as to in particular connect two elements to one another to which the force-fit and/or form-fit elements are coupled. A force-fitting and/or form-fitting connection between the two elements herein can be implemented so as to be purely force-fitting, purely form-fitting, or as a combination of force-fitting and form-fitting. "Coupled in a force-fitting and/or form-fitting manner" herein is in particular to be understood to be connected to one another by way of a releasable connection, wherein the holding force between two elements is preferably transmitted by way of a geometric mutual engagement of the elements and/or a friction force between the elements. "At least two force-fit and/or form-fit elements" herein is in particular to be understood that the locking module has at least two force-fit and/or form-fit elements, in one preferred design embodiment three force-fit and/or form-fit elements, wherein it is in principle also conceivable that the locking module comprises more force-fit and/or form-fit elements. The at least two force-fit and/or form-fit elements herein are preferably in each case disposed so as to be eccentric. The at least two force-fit and/or form-fit elements are disposed spaced apart from a central plane of the table unit. The at least two force-fit and/or form-fit elements herein are preferably disposed on opposite sides of the central plane of the table unit, and in particular have in each case an identical spacing from the central plane. In one particularly preferred design embodiment, the at least two force-fit and/or form-fit elements are advantageously disposed in opposite peripheral regions of the table unit. A "peripheral region of the table unit" herein is in particular to be understood to be in each case a region which from a lateral edge of the table unit reaches as far as up to 10 cm, preferably 5 cm, in the direction of a central plane of the table unit. "Provided" is in particular to be understood to be specially conceived and/or equipped. An object being configured for a specific function is in particular to mean that the object fulfils and/or carries out said specific function in at least one state of application and/or operation. On account of a design embodiment according to the invention, a locking action of the table unit in the stowage position which is in particular implemented so as to be robust and prevents an unintentional release of the table unit from the seat component also in the event of a crash can be advantageously achieved. On account thereof, a table device for a seat, in particular an aircraft seat, which is particularly safe in the event of a crash and in particular minimizes risk of injury can be advantageously provided.

It is furthermore proposed that the force-fit and/or form-fit elements are configured for being adjusted between a release position, in which the force-fit and/or form-fit elements are disposed at least substantially in the attachment unit, and a locked position, in which the force-fit and/or form-fit elements at least in part engage in a form-fitting manner in the table unit. A "release position" herein is in particular to be understood to be a position of the force-fit and/or form-fit elements in which the force-fit and/or form-fit elements release the table unit and do not couple the latter in a force-fitting and/or form-fitting manner to the attachment unit and on account thereof to the seat component. The table unit in the release position of the force-fit and/or form-fit elements can be adjusted from the stowage position of said table unit to the use position. A "locked position" herein is in particular to be understood to be a position of the force-fit and/or form-fit elements in which the force-fit and/or form-fit elements protrude at least from the attachment unit and thus are able to be connected in a force-fitting and/or form-fitting manner to the table unit, in particular to the force-fit and/or form-fit elements implemented by the table unit, when the table unit in a corresponding manner is positioned in the stowage position. The force-fit and/or form-fit elements in the locked position lock the table unit in the stowage position of the latter. When the force-fit and/or form-fit elements in the locked position thereof engage in a force-fitting and/or form-fitting manner in the table unit disposed in the stowage position, the table unit is locked and cannot be moved out of the stowage position. On account thereof, the table unit can be connected in a particularly reliable manner to the attachment unit.

It is furthermore proposed that the locking module has an actuation mechanism which is disposed at least substantially in the attachment unit and is configured for an actuation of the force-fit and/or form-fit elements. An "actuation mechanism" herein is in particular to be understood to be a mechanism which is configured for adjusting the force-fit and/or form-fit elements between the release position thereof and the locked position thereof, said force-fit and/or form-fit elements being disposed in the attachment unit. The actuation mechanism herein in a non-actuated state is in particular configured for moving the force-fit and/or form-fit elements to the release position thereof and holding said force-fit and/or form-fit elements therein, and in an actuated state is configured for moving said force-fit and/or form-fit elements to the locked position thereof and holding said force-fit and/or form-fit elements therein. "Disposed at least substantially in the attachment unit" herein is in particular to be understood that at least a major part of the elements of the actuation mechanism is disposed in the attachment unit, in particular in a space defined by the attachment unit. The entire actuation mechanism is preferably disposed in the attachment unit. On account thereof, the force-fit and/or form-fit elements can be actuated in a particularly simple manner, and the locking module can be implemented in a particularly simple manner.

It is furthermore proposed that the locking module has at least one actuation element which is configured for manual operation by a passenger and is attached to the table unit, and has at least one force-fit and/or form-fit element by means of which the table unit in a locked state is coupled in a form-fitting and/or force-fitting manner to the attachment unit. An "actuation element" herein is in particular to be understood to be an element which is configured for an actuation by a passenger and is implemented in a corresponding manner. The actuation element herein by means of the actuation mechanism is in particular configured for adjusting the force-fit and/or form-fit elements of the locking module from the release position thereof to the locked position thereof. A "manual operation" herein is particular to be understood as a manipulation by a passenger by means of his/her hand. The actuation element herein is configured for being pushed, axially displaced and/or rotated by an operator. "Being attached to the table unit" herein is in particular to be understood that the actuation element is attached in a locationally fixed manner to the table unit and is moved with the table unit between the stowage position and the use position of the latter. On account thereof, the locking module can particularly advantageously be configured for simple operation by a passenger.

It is furthermore proposed that the actuation element is embodied as a rotary element which by way of the force-fit and/or form-fit element thereof in a locked state at least in part engages in the attachment unit. A "rotary element" herein is in particular to be understood to be an element which is able to be actuated by the passenger by rotation about a rotation axis. On account thereof, the actuation element can be implemented in a particularly simple manner.

It is furthermore proposed that the actuation element when coupling to the attachment unit is configured for initiating a relative movement of the table unit and the attachment unit. A "relative movement between the table unit and the attachment unit" herein is in particular to be understood to be a movement of the table unit relative to the attachment unit and the seat component, preferably in a vertical direction. "When coupling initiating a relative movement" herein is in particular to be understood that the relative movement is triggered by an engagement of the actuation element in the attachment unit, and in particular by a movement, in particular a rotation of the actuation element. On account thereof, the table unit can be particularly advantageously locked to the attachment unit.

It is moreover proposed that the actuation element when coupling to the attachment unit is configured for an actuation of the actuation mechanism. An "actuation of the actuation mechanism" herein is in particular to be understood that the actuation element adjusts the actuation mechanism such that the actuation mechanism moves the force-fit and/or form-fit elements from the release position thereof to the locked position thereof. On account thereof, the force-fit and/or form-fit elements of the locking module can be particularly advantageously actuated by means of the actuation element.

It is furthermore proposed that the force-fit and/or form-fit elements are configured for locking the table unit by way of a friction fit, and in the event of a force in an opening direction of the table unit for increasing the friction fit by way of self-reinforcement. An "opening direction" herein is in particular to be understood to be a direction in which the table unit has to be moved out of the locked position thereof so as to reach the use position thereof. On account thereof, the table device can be particularly advantageously secured in the stowage position.

It is moreover proposed that the force fit and/or form-fit elements are in each case embodied as a cam which for locking is configured for fixing the table unit at least by way of a friction fit. "Fixing by way of a friction fit" herein is in particular to be understood that a holding force of the two force-fit and/or form-fit elements required for locking in the stowage position is established only by way of a force-fit. On account thereof, the table unit can be held in a particularly simple manner in the stowage position.

It is furthermore proposed that the force-fit and/or form-fit elements embodied as cams are pivotably supported, preferably eccentrically pivotably supported, and in an opening movement of the table unit are provided be pivoted. "Eccentrically pivotably supported" herein is in particular to be understood that the force-fit and/or form-fit element embodied as a cam is supported about a pivot axis which is disposed offset to a center of gravity of the force-fit and/or form-fit element embodied as a cam. On account thereof, the force-fit and/or form-fit element embodied as a cam can be particularly advantageously supported in order for the table device be securely supported in the stowage position.

It is furthermore proposed that the force-fit and/or form-fit elements are disposed in the table unit and for locking the table unit are configured for being in each case at least substantially encompassed by at least one form-fit element disposed in the attachment unit, wherein the form-fit element disposed in the attachment unit for unlocking is supported so as to be elastically deflectable and/or movable. "Disposed in the table unit" herein is in particular to mean that the force-fit and/or form-fit elements are at least in part disposed within a base body implementing the table unit. The force-fit and/or form-fit elements herein are preferably disposed in a recess incorporated in the base body implementing the table unit. The force-fit and/or form-fit elements herein preferably do not protrude beyond a plane implemented by the table surface. "Elastically deflectable" herein is in particular to be understood to be modified in terms of shape, thus compressed, elongated, and/or deflected, by virtue of a force acting in an elastic region, wherein a resting position is assumed once the force acting thereon subsides. On account thereof, particularly advantageous locking of the table unit can be achieved.

It is furthermore proposed that the locking module has at least one unlocking element which is attached to the table unit and for unlocking the force-fit and/or form-fit elements is configured for elastically deforming and/or moving the at least one form fit elements at least in part. On account thereof, a locking action of the table unit can be cancelled in a particularly simple manner.

It is furthermore proposed that the force-fit and/or form-fit elements are configured for coupling the table unit to the attachment unit in a force-fitting and/or form-fitting connection that is releasable in the opening direction of the table unit. On account thereof, the table unit can be coupled to the attachment unit in a particularly simple manner.

It is furthermore proposed that the locking module has an actuation mechanism which comprises at least one lever element which is configured for actively pushing or pulling at least one of the force-fit and/or form-fit elements out of a locked position. On account thereof, a locking action of the force-fit and/or form-fit elements can be released in a particularly simple manner.

It is moreover proposed that the table unit is implemented of at least two base bodies which are pivotably connected by way of at least one support unit and which to this end have at least one articulation element, wherein the force-fit and/or form-fit elements implemented by the table unit are implemented by an articulation element. A "support unit" herein is in particular to be understood to be a unit having at least one articulation implementing a pivot axis by way of which at least two elements, such as in particular the two base bodies, are mutually pivotable. An "articulation element" herein is in particular to be understood to be an element of the articulation unit, such as in particular a bearing bolt or a bearing pin. Thus in principle, it is also conceivable that an articulation element is implemented by another element of the articulation unit, or by an additional element which is connected to the articulation unit. On account thereof, the force-fit and/or form-fit elements of the table unit can be implemented in a particularly advantageous manner.

Furthermore proposed is a seat according to the invention, in particular an aircraft seat, having at least one seat component and a table device, wherein the seat component implements a storage region, in particular a high literature pocket, wherein the table device has an attachment unit embodied as a back rest bridge, wherein an opening implementing a fill-in opening of the storage region is disposed between the attachment unit and the seat component. On account thereof, a particularly advantageous seat in which the table device is particularly advantageously integrated can be provided.

The table device according to the invention herein is not be limited to the applications and embodiments described above. In particular, the table device according to the invention for fulfilling a functional mode described herein may have a number of individual elements, components, and units that deviate from the number mentioned herein.

DRAWINGS

Further advantages are derived from the following description of the drawings. Six exemplary embodiments of the invention are illustrated in the drawings. The drawings, the description, and the claims include numerous features in combination. The person skilled in the art will expediently also consider the features individually and combine said features so as to form expedient further combinations.

DESCRIPTION OF THE EXEMPLARY EMBODIMENTS

Figure 1:
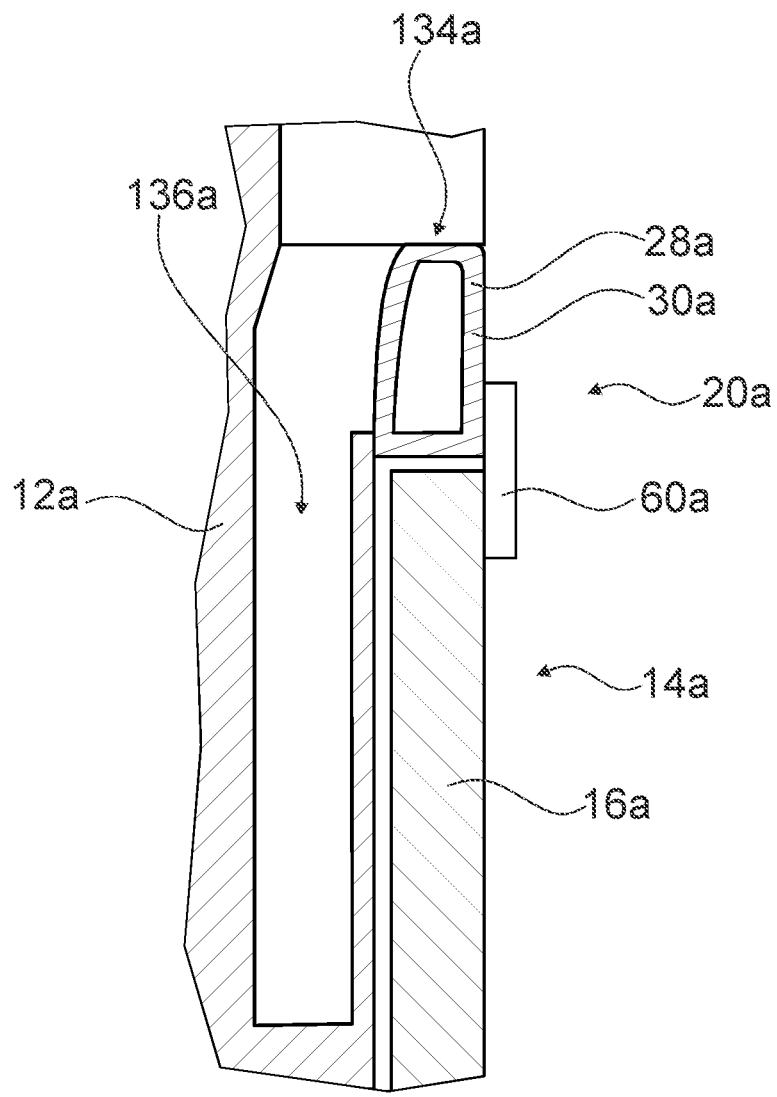
FIG. 1 shows a schematic sectional view of part of a seat according to the invention, having a table device and a seat component implementing a storage region.
Figure 2:
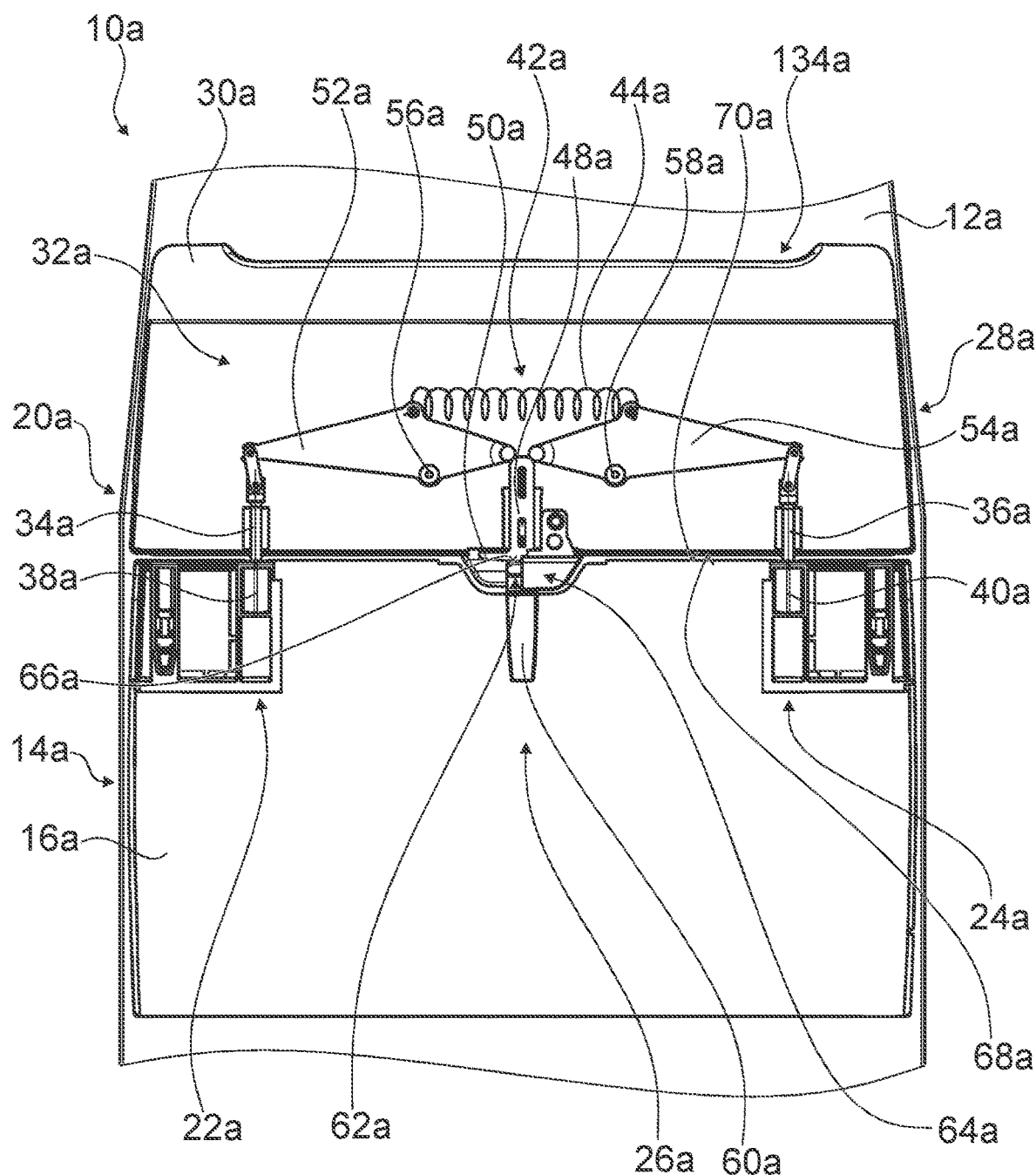
FIG. 2 shows a schematic illustration of the table device in a first exemplary embodiment, having a table unit in a stowage position in a locked state.
Figure 3:
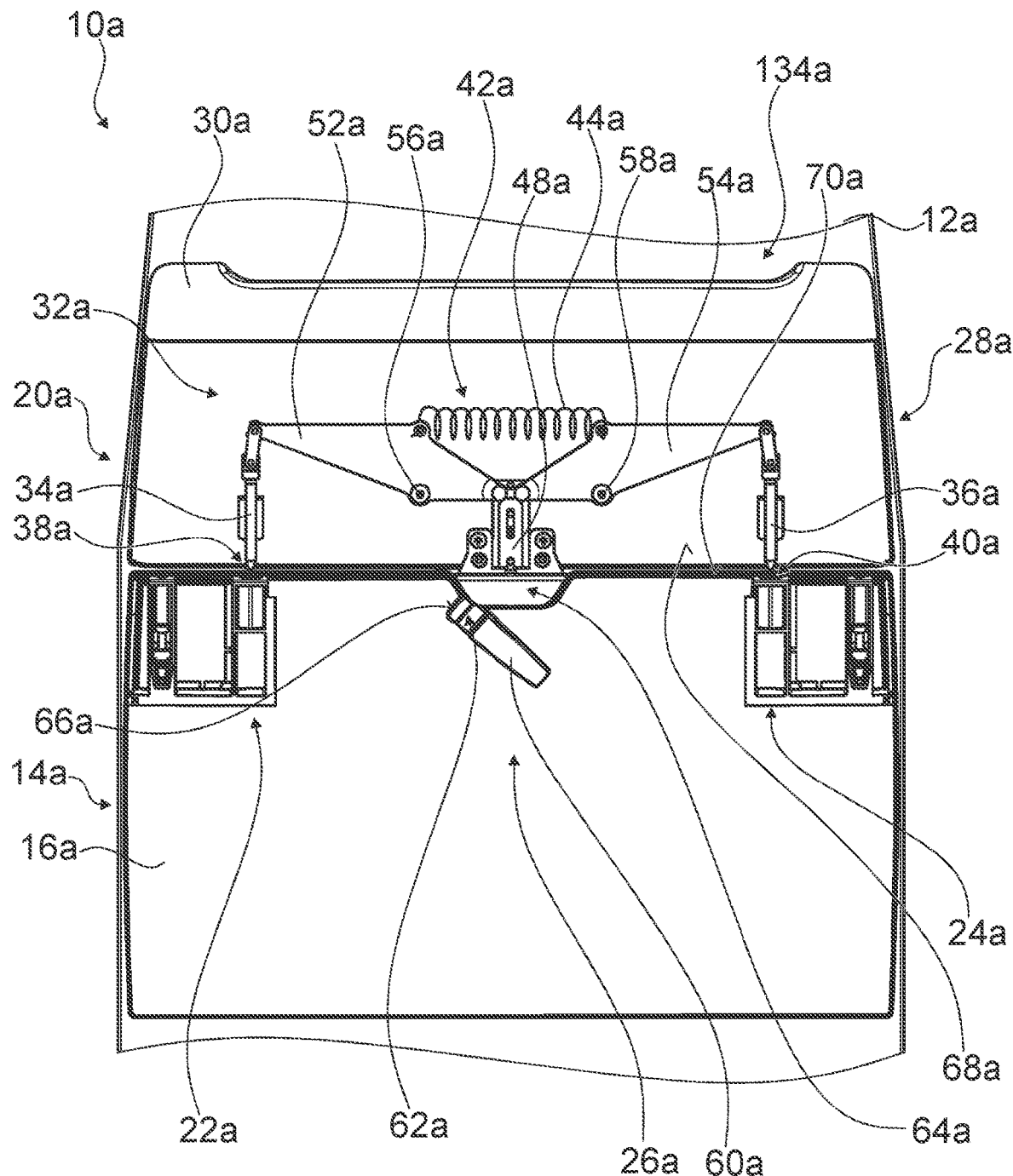
FIG. 3 shows a schematic illustration of the table unit in the stowage position and of the locking module in an unlocked state.

FIGS. 1 to 4 show a table device for a seat 10a in a first exemplary embodiment. The seat 10a is embodied as an aircraft seat. The seat 10a herein is only indicated in the figures. The seat 10a has a seat component 12a. The seat component 12a is realized as a back rest. The seat 10a embodied as an aircraft seat in the exemplary embodiment described is implemented like an aircraft seat known from the prior art and is therefore not to be described in more detail here. In principle, it is also conceivable that the seat 10a is embodied as another seat considered expedient by the person skilled in the art, for example as a passenger seat disposed in a bus or train. The seat 10a by means of an installation unit is installed on an installation plane. The installation plane is formed by a cabin floor.

The table device comprises a table unit 14a. The table unit 14a is implemented by a base body 16a. The base body 16a implements a table base body. The base body 16a is formed from a plastics material. The base body 16a herein at least in part implements a hollow member. The table unit 14a is attached to the seat 10a. The base body 16a herein is implemented by a base shell and a board that is fixedly connected to the base shell. In principle, it is also conceivable that the base body 16a is made of another material considered expedient by the person skilled in the art, and/or has a construction considered expedient by the person skilled in the art. In principle, the base body 16a implementing the table unit 14a is implemented so as to correspond to the prior art. The table unit 14a has a table surface 18a. The table surface 18a is embodied as a surface of the base body 16a. The table unit 14a is coupled to the seat 10a by way of a pivot bearing. The table device comprises a bearing module (not illustrated in more detail) by way of which the table unit 14a is pivotably connected to the seat 10a. The bearing module herein comprises two bearing arms which at a first end are in each case attached pivotably to the seat 10a by way of a pivot bearing. The bearing arms herein by way of the first end thereof are attached to the seat component 12a realized as a back rest, or attached to seat dividers (not illustrated in more detail) of the seat 10a. The table unit 14a and a second end of the bearing arms is connected to the bearing arms by way of pivot bearings. The table unit 14a is adjustable between a stowage position and a use position. The table unit 14a is able to be pivoted between the use position and the stowage position in particular by way of the bearing module. The table unit 14a in the use position, by way of the table surface 18a of the table unit 14a, is aligned so as to be substantially parallel with the installation plane such that items can be placed on the table surface 18a of the table unit 14a. The table unit 14a in the stowage position leans against the seat component 12a. The table unit 14a by way of the table surface 18a thereof is aligned in the direction of the seat component 12a. The table unit 14a in the stowage position is folded against the seat component 12a and cannot be utilized for placing items.

The table device comprises a locking module 20a. The locking module 20a is configured for fixing the table unit 14a in the stowage position thereof on the seat component 12a. The locking module 20a has a locked state in which the locking module 20a locks the table unit 14a in the stowage position thereof. The locking module 20a has an unlocked state in which the locking module 20a releases the table unit 14a so that the latter can be moved out of the stowage position thereof. The locking module 20a is in particular configured for fixing the table unit 14a on the seat component 12a such that the table unit 14a is securely fixed on the seat component 12a even in the event of a crash. The locking module 20a herein is in particular configured for fixing the table unit 14a on the seat component 12a such that the table unit 14a in an impact of a body part of the passenger sitting behind the seat 10a on the seat component 12a and/or the table unit 14a in the event of a crash and of a deformation of the seat component 12a caused on account thereof is at least in part conjointly moved with the seat component 12a and it is thus in particular prevented that a gap between the seat component 12a and the table unit 14a in which the passenger by way of a body part can be trapped can be formed on account of the deformation of the seat component 12a. The locking module 20a is in particular configured for preventing an offset between the table unit 14a and the seat component 12a. For this purpose, the locking module 20a is configured for coupling the table unit 14a in various positions to the seat component 12a. The locking module 20a is in particular configured for coupling the table unit 14a to the seat component 12a in two opposite peripheral regions 22a, 24a. The locking module 20a is configured for additionally coupling the table unit 14a to the seat component 12a in a central region 26a. The table unit 14a by means of the locking module 20a is fixedly coupled to the seat component 12a at three positions. On account thereof, particularly stable fixing of the table unit 14a on the seat component 12a can be achieved.

The locking module 20a has an attachment unit 28a. The attachment unit 28a is fixedly connected to the seat component 12a. In principle, it is also conceivable that the attachment unit 28a at least partially or completely is implemented by the seat component 12a. The attachment unit 28a has a housing 30a. The housing 30a is formed by a base body. The housing 30a is formed by a base shell and a cover plate. The housing 30a defines an internal space 32a. The internal space 32a of the housing 30a of the attachment unit 28a is configured for components of the locking module 20a to be disposed and/or supported in said internal space 32a. The attachment unit 28a is rigidly connected to the seat component 12a. The housing 30a of the attachment unit 28a is fixedly connected to the seat component 12a. The housing 30a of the attachment unit 28a is in particular connected to a supporting structure of the seat component 12a. The housing 30a of the attachment unit 28a is connected to the seat component 12a by way of a force-fitting and/or form-fitting connection.

The attachment unit 28a is realized as a back rest bridge. The attachment unit 28a in peripheral regions is connected to the seat component 12a realized as a back rest. The attachment unit 28a realized as a back rest bridge in a central region has a spacing from the seat component 12a realized as a back rest. An opening 134a is implemented in the central region between the attachment unit 28a and the seat component 12a realized as a back rest. The back rest implements a storage region 136a. The storage region 136a is embodied as a high literature pocket. The storage region 136a is provided so that items, such as in particular reading material, can be disposed therein. The storage region 136a herein is in particular disposed in a region in which the table unit 14a can be folded against the seat component 12a. The opening 134a between the attachment unit 28a and the seat component 12a is implemented as a fill-in opening of the storage region 136a by way of which items, such as in particular reading material, can be introduced into the storage region 136a or can be retrieved from the latter.

The attachment unit 28a is provided so that the table unit 14a in the stowage position thereof is able to be attached to the attachment unit 28a. The attachment unit 28a is disposed above the table unit 14a. The attachment unit 28a in the stowage position of the table unit 14a is disposed above the table unit 14a. An upper end of the table unit 14a in the stowage position is contiguous to a lower end of the attachment unit 28a. A lower edge of the attachment unit 28a in the stowage position of the table unit 14a is implemented so as to be at least substantially congruent with a front edge of the table unit 14a. The front edge of the table unit 14a in the stowage position faces the lower edge of the attachment unit 28a. A transition between the table unit 14a and the attachment unit 28a in the stowage position of the table unit 14a is smooth. A rear face of the base body 16a of the table unit 14a facing a passenger transitions to a surface of the attachment unit 28a that is implemented by the housing 30a. In the stowage position of the table unit 14a, neither the attachment unit 28a nor the table unit 14a protrudes rearwards in a transition region between the table unit 14a and the attachment unit 28a. The table unit 14a in the stowage position thereof can be locked on the attachment unit 28a. The table unit 14a by way of the attachment unit 28a that is fixedly connected to the seat component 12a is able to be fixedly locked to the seat component 12a.

The locking module 20a comprises two form-fit elements 34a, 36a. The form-fit elements 34a, 36a are configured for attaching in a form-fitting manner the table unit 14a to the attachment unit 28a. The table unit 14a in the locked state is coupled in a form-fitting manner to the attachment unit 28a by means of the form-fit elements 34a, 36a. The form-fit elements 34a, 36a are disposed in outer peripheral regions 22a, 24a of the attachment unit 28a, said peripheral regions 22a, 24a being in each case disposed congruent with one of the outer peripheral regions 22a, 24a of the table unit 14a. The form-fit elements 34a, 36a are implemented as pin elements. The form-fit elements 34a, 36a implemented as pin elements herein have an elongate extent. In principle, it is also conceivable that the form-fit elements 34a, 36a are implemented in another manner considered expedient by the person skilled in the art, for example as hook elements. The form-fit elements 34a, 36a are disposed in the attachment unit 28a. The form-fit elements 34a, 36a are movably supported in the accommodation regions of the attachment unit 28a. The form-fit elements 34a, 36a are supported in the internal space 32a that is implemented by the attachment unit 28a. The accommodation regions in which the form-fit elements 34a, 36a are movably supported are implemented by the base body 16a in the internal space 32a of the attachment unit 28a. The form-fit elements 34a, 36a are supported so as to be axially movable in the attachment unit 28a. The accommodation regions for the form-fit elements 34a, 36a to this end implement longitudinal guides. The form-fit elements 34a, 36a are in each case axially displaceable along a displacement axis. The displacement axes of the two form-fit elements 34a, 36a herein run so as to be mutually parallel. In principle, it is also conceivable that the displacement axes of the two form-fit elements 34a, 36a are tilted towards one another. The displacement axes in which the form-fit elements 34a, 36a are axially displaceable are substantially aligned in a vertical direction. The form-fit elements 34a, 36a are disposed on the lower end of the attachment unit 28a. The form-fit elements 34a, 36 in the attachment unit 28a are displaceable between a release position and a locked position. The form-fit elements 34a, 36 in the release position are disposed completely within the attachment unit 28a. The form-fit elements 34a, 36a in the release position are disposed completely in the internal space 32a defined by the housing 30a. The form-fit elements 34a, 36a in the release position thereof do not contact the table unit 14a. The locking module 20a in the release position of the form-fit elements 34a, 36a is in the unlocked state of said locking module 20a. In principle, it is also conceivable that the form-fit elements 34a, 36a in the release position thereof insignificantly protrude from the attachment unit 28a, wherein the form-fit elements 34a, 36a cannot contact the table unit 14a. The form-fit elements 34a, 36a in the locked position at the lower end protrude from the housing 30a of the attachment unit 28a. The form-fit elements 34a, 36a in the locked position by way of a form-fit region protrude into a contact region of the table unit 14a. The form-fit elements 34a, 36a in the locked position protrude in a downward manner so far out of the attachment unit 28a that the form-fit elements 34a, 36a can come into a form-fitting contact with the table unit 14a. When the table unit 14a is disposed in the stowage position thereof, the form-fit elements 34a, 36a can be moved from the release position thereof to the locked position such that said form-fit elements 34a, 36a engage in a form-fitting manner in the table unit 14a.

For coupling in a form-fitting manner to the form-fit elements 34a, 36a disposed in the attachment unit 28a, the locking module 20a has two form-fit elements 38a, 40a that are fixedly connected to the table unit 14a. The form-fit elements 38a, 40a of the table unit 14a are implemented in a manner corresponding to the form-fit elements 34a, 36a of the attachment unit 28a. The form-fit elements 38a, 40a of the table unit 14a are realized as recesses in the base body 16a of the table unit 14a. The form-fit elements 38a, 40a of the table unit 14a that are realized as recesses are incorporated in the front edge of the table unit 14a. The form-fit elements 38a, 40a of the table unit 14a that are realized as recesses are disposed in the outer peripheral regions 22a, 24a of the table unit 14a. The form-fit elements 38a, 40a of the table unit 14a that are realized as recesses in the stowage position of the table unit 14a are aligned so as to be congruent with the form-fit elements 34a, 36a of the attachment unit 28a that are implemented as pin elements. The form-fit elements 34a, 36a of the attachment unit 28a that are implemented as pin elements in the stowage position of the table unit 14a can be moved from the release position of said form-fit elements 34a, 36a to the locked position in which said form-fit elements 34a, 36a then engage in a form-fitting manner in the form-fit elements 38a, 40a of the table unit 14a that are realized as recesses. When the form-fit elements 34a, 36a of the attachment unit 28a that are implemented as pin elements engage in a form-fit manner in the form-fit elements 38a, 40a of the table unit 14a that are realized as recesses, the table unit 14a in the outer peripheral regions 22a, 24a is fixedly coupled to the attachment unit 28a and thus to the seat component 12a.

The locking module 20a comprises an actuation mechanism 42a. The actuation mechanism 42a is configured for an actuation of the movably supported form-fit elements 34a, 36a. The actuation mechanism 42a is configured for adjusting the form-fit elements 34a, 36a between the release position thereof and the locked position thereof. The actuation mechanism 42a is disposed in the attachment unit 28a. The actuation mechanism 42a is configured for transmitting an actuation movement exerted thereon to the two form-fit elements 34a, 36a so as to actuate the latter, in particular so as to move said form-fit elements 34a, 36a from the release position thereof to the locked position thereof. The actuation mechanism 42a has a non-actuated position and an actuated position. In the non-actuated position of the actuation mechanism 42a, the form-fit elements 34a, 36a are disposed in the release position thereof. The actuation mechanism 42a in the non-actuated position is configured for moving in a self-acting manner form-fit elements 34a, 36a to the release position thereof.

The actuation mechanism 42a for receiving an actuation movement has an accommodation element 48a. The accommodation element 48a is implemented as an axially displaceable lever. The accommodation element 48a when viewed in a transverse direction is disposed so as to be centric in the attachment unit 28a. The accommodation element 48a is disposed in a central region of the attachment unit 28a. The accommodation element 48a is implemented as a T-shaped element. The accommodation element 48a by way of an axial central region is axially guided in a guide groove implemented by the housing 30a of the attachment unit 28a. The accommodation element 48a is supported so as to be axially displaceable in the guide groove. The accommodation element 48a is supported so as to be displaceable in an axial direction which is aligned so as to be parallel with the vertical direction. The axial direction in which the accommodation element 48a is displaceable is aligned so as to be parallel with the displacement axes of the form-fit elements 34a, 36a. The accommodation element 48a at a lower end which at least in part protrudes from an internal space 32a of the housing 30a has a wide actuation region 50a. An actuation movement can be introduced into the actuation mechanism 42a by way of the actuation region 50a. The accommodation element 42a for adjusting the actuation mechanism 42a is provided to be moved upward, away from a lower end of the attachment unit 28a.

The actuation mechanism 42a has a first coupling element 52a and a second coupling element 54a. The coupling elements 52a, 54a are configured for transmitting in each case an actuation movement of the accommodation element 48a to a form-fit element 34a, 36a. The coupling elements 52a, 54a are implemented as lever elements which are disposed in the internal space 32a of the housing 30a of the attachment unit 28a. The coupling elements 52a, 54a implemented as lever elements herein are implemented in the manner of plates. The coupling elements 52a, 54a are in each case supported in the internal space 32a of the housing 30a so as to be pivotable by way of a pivot axis 56a, 58a. The pivot axes 56a, 58a are disposed in a lower region of the coupling elements 52a, 54a. The coupling elements 52a, 54a have in each case one first end. The coupling elements 52a, 54a by way of the first ends thereof face one another. The coupling elements 52a, 54a by way of the first ends thereof are disposed in the central region of the attachment unit 28a. The coupling elements 52a, 54a by way of the first ends thereof in an actuation of the accommodation element 48a are provided to come into contact with the accommodation element 48a and to be deflected by the latter. The first ends of the coupling elements 52a, 54a herein by the accommodation element 48a are pushed upward, away from the lower region of the attachment unit 28a. The coupling elements 52a, 54a have in each case one second end which lies opposite the respective first end of the coupling element 52a, 54a. The second ends of the coupling elements 52a, 54a are in each case disposed in one of the peripheral regions of the attachment unit 28a. The second ends of the coupling elements 52a, 54a face in each case one of the form-fit elements 34a, 36a. The first coupling element 52a by way of the second end thereof is coupled to the one form-fit element 34a. A movement of the coupling element 52a is transmitted to the form-fit element 34a. The second coupling element 54a by way of the second end thereof is coupled to the other form-fit element 36a. A movement of the coupling element 54a is transmitted to the form-fit element 36a. The accommodation element 48a in an adjustment of the actuation mechanism 42a is moved from the non-actuated position upward to the actuated position, and deflects the coupling elements 52a, 54a by way of the first end thereof upward, on account of which said coupling elements 52a, 54a by way of the second end thereof, which is in each case attached to form-fit element 34a, 36a, are pivoted downward, on account of which the form-fit elements 34a, 36a from the release position thereof are pushed downward in the direction of the table unit 14a, to the locked position of said form-fit elements 34a, 36a.

The actuation mechanism 42a for adjusting in a self-acting manner in the form-fit elements 34a, 36a to the release position thereof is configured for fixing the coupling elements 52a, 54a in the neutral position thereof when said coupling elements 52a, 54a are not deflected by the accommodation element 48a. To this end, the actuation mechanism 42a has a spring element 44a. The spring element 44a is disposed between the two coupling elements 52a, 54a. The spring element 44a is realized as a tension spring which pulls the coupling elements 52a, 54a toward one another by way of the attachment points of said coupling elements 52a, 54a to which the spring element 44a is in each case attached. The spring element 44a is configured for pulling the coupling elements 52a, 54a to a position in which the form-fit elements 34a, 36a are disposed in the release position thereof. The form-fit elements 34a, 36a are adjusted to the locked position thereof in the actuated position of the actuation mechanism 42*a*. The actuation mechanism 42*a* in an adjustment of the actuation mechanism 42*a* from the non-actuated position thereof to the actuated position thereof is configured for deflecting the form-fit elements 34*a*, 36*a* from the release position thereof to the locked position thereof. The actuation mechanism 42*a* herein is configured for deflecting the form-fit elements 34*a*, 36*a* counter to the spring force of the spring element 44*a*. The accommodation element 48*a* in an adjustment of the actuation mechanism 42*a* from the non-actuated position to the actuated position is moved upward and deflects the coupling elements 52*a*, 54*a* by way of the first end thereof upward, on account of which said coupling elements 52*a*, 54*a* by way of the second end thereof, one form-fit element 34*a*, 36*a* being in each case attached to said second end, are pivoted downward, on account of which the form-fit elements 34*a*, 36*a*, counter to the spring force of the spring element 44*a*, are pushed out of the release position thereof downward in the direction of the table unit 14*a*, to the locked position of said form-fit elements 34*a*, 36*a*.

The actuation mechanism 42*a* in the non-actuated position is configured for moving in a self-acting manner the form-fit elements 34*a*, 36*a* to the release position thereof. In principle, it is also conceivable that the actuation mechanism 42*a* for the self-acting adjustment of the form-fit elements 34*a*, 36*a* to the release position thereof has in each case one spring element per form-fit element 34*a*, 36*a*. The spring elements herein would be disposed in the accommodation regions in which the form-fit elements 34*a*, 36*a* are supported, and would in each case exert a spring force on a form-fit element 34*a*, 36*a* that would push the respective form-fit element 34*a*, 36*a* to the release position thereof. The spring elements herein would be realized as compression springs. The spring elements herein would in particular be realized as coil springs. In principle, it is also conceivable that the spring elements are implemented as other springs considered expedient by the person skilled in the art. If a spring element were be attached to each form-fit element 34*a*, 36*a*, it would be likewise conceivable that a transmission of the movement of the coupling elements 52*a*, 54*a* to the form-fit elements 34*a*, 36*a* is performed by way of a friction fit and not by way of pivotable coupling. In principle, it is likewise conceivable that the actuation mechanism 42*a* is implemented in another manner considered expedient by the person skilled in the art, and for example has a gearbox which, for example, has a plurality of intermeshing gear wheel elements or levers.

The locking module 20*a* comprises an actuation element 60*a*. The actuation element 60*a* is configured for manual operation by a passenger. The actuation element 60*a* is configured for adjusting the locking module 20*a* between the unlocked position thereof and the locked position thereof. An operator, in particular passenger, by manual operation of the actuation element 60*a* can adjust the locking module 20*a* between the locked position and the unlocked position. On account thereof, the passenger by an actuation of the actuation element 60*a* can selectively fix the table unit 14*a* in the stowage position on the seat component 12*a* or release said table unit 14*a* and then move the latter to the use position thereof. An operator can manually adjust the actuation element 60*a* between an actuation position and a non-actuation position. The actuation element 60*a* in an actuation position actuates the actuation mechanism 42*a* to the actuated position thereof when the table unit 14*a* is disposed in the stowage position thereof. When the actuation element 60*a* is disposed in the non-actuation position thereof, said actuation element 60*a* actuates the actuation mechanism 42*a* and the latter is disposed in the non-actuated position thereof. The actuation element 60*a* is implemented as a rotary element. The actuation element 60*a* implemented as a rotary element is attached to the table unit 14*a* by way of a rotary bearing. The actuation element 60*a* by rotation about a rotation axis implemented by the rotary bearing can be rotated between the actuation position and the non-actuation position. The actuation element 60*a* is attached to the table unit 14*a*. The actuation element 60*a* is disposed on a rear side of the table unit 14*a* that lies opposite the table surface 18*a*. The actuation element 60*a* is disposed in a front region of the table unit 14*a*. The actuation element 60*a* is attached so as to be centric on the table unit 14*a*.

The actuation element 60*a* has a form-fit element 62*a*. The form-fit element 62*a* is configured for being connected in a form-fitting manner to the attachment unit 28*a*. The form-fit element 62*a* in the actuation position of the actuation element 60*a* is connected in a form-fitting manner to the attachment unit 28*a*. The form-fit element 62*a* herein can be brought into form-fitting contact with the attachment unit 28*a* when the table unit 14*a* is disposed in the stowage position thereof. The form-fit element 62*a* is disposed on a front end of the actuation element 60*a*. The form-fit element 62*a* is embodied as a hook element. The form-fit element 62*a* embodied as a hook element in an adjustment of the actuation element 60*a* from the non-actuation position to the actuation position is configured for engaging in a form-fitting manner with the attachment unit 28*a* when the table unit 14*a* is disposed in the stowage position thereof. The attachment unit 28*a* for coupling in a form-fitting manner to the form-fit element 62*a* of the actuation element 60*a* has a correspondingly implemented form-fit element 64*a*. The form-fit element 64*a* is implemented as an undercut which is implemented so as to correspond to the form-fit element 62*a* embodied as a hook element. The form-fit element 64*a* implemented as an undercut has a curved guide track.

The actuation element 60*a* when coupling to the attachment unit 28*a* is configured for an actuation of the actuation mechanism 42*a*. The actuation element 60*a* on the upper side thereof implements a contact region 66*a*. The contact region 66*a* when coupling the actuation element 60*a* to the attachment unit 28*a* is configured for contacting the actuation region 50*a* of the accommodation element 48*a* of the actuation mechanism 42*a*. When coupling, the actuation element 60*a* by way of the contact region 66*a* thereof actuates the accommodation element 48*a* and axially displaces the latter. The actuation element 60*a* exerts an actuation movement on the actuation mechanism 42*a*. On account of an adjustment of the actuation element 60*a* from the non-actuation position thereof to the actuation position thereof while the table unit 14*a* is situated in the stowage position thereof, the form-fit element 62*a* of the actuation element 60*a* engages in a form-fitting manner in the corresponding form-fit element 64*a* of the attachment unit 28*a* and thus locks the table unit 14*a* so as to be centric to the attachment unit 28*a*, and the form-fit elements 34*a*, 36*a* of the attachment unit 28*a*, on account of the actuation of the actuation mechanism 42*a* by means of the contact region 66*a* of the actuation element 60*a*, are simultaneously brought into form-fitting contact with the correspondingly implemented form-fit elements 38*a*, 40*a* of the table unit 14*a*, and on account thereof in the peripheral regions 22*a*, 24*a* lock the table unit 14*a* to the attachment unit 28*a*. On account thereof, by the adjustment of the one actuation element 60*a* from the non-actuation position thereof to the actuation position thereof when the table unit 14*a* is disposed in the stowage position thereof, the table unit 14a in a central region 26a and in the two peripheral regions 22a, 24a can advantageously be locked in a form-fitting manner to the attachment unit 28a.

Five further exemplary embodiments of the invention are shown in FIGS. 5 to 18. The descriptions hereunder and the drawings are limited substantially to the points of differentiation between the exemplary embodiments, wherein reference in terms of identically referenced components, in particular in terms of components having identical reference signs, can in principle also be made to the drawings and/or the description of the other exemplary embodiments, in particular those of FIGS. 1 to 4. In order to differentiate between the exemplary embodiments, the suffix a is used for the reference signs of the exemplary embodiment in FIGS. 1 to 4. The suffix a is replaced by the letters b to fin the exemplary embodiments of FIGS. 5 to 18.

Figure 4:
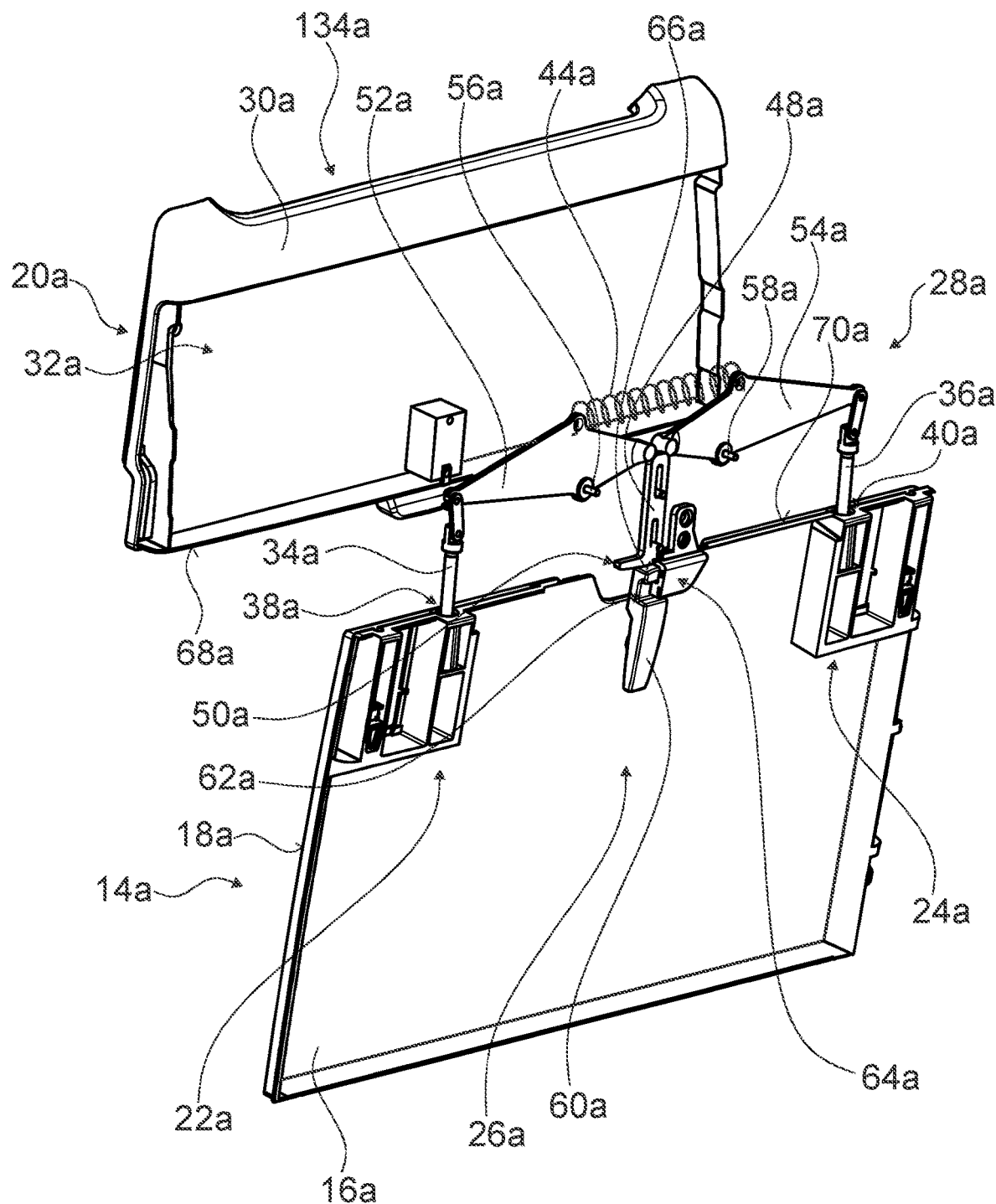
FIG. 4 shows a schematic illustration of the table unit and of the locking module in an exploded view.
Figure 5:
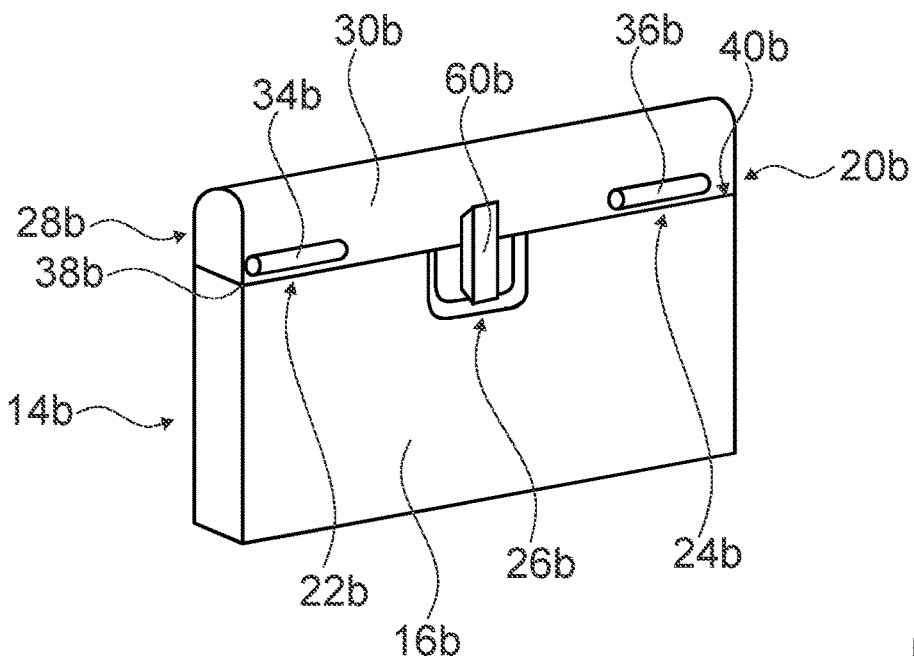
FIG. 5 shows a schematic illustration of a table device in a second exemplary embodiment, having a table unit in a stowage position and in a locked state.
Figure 6:
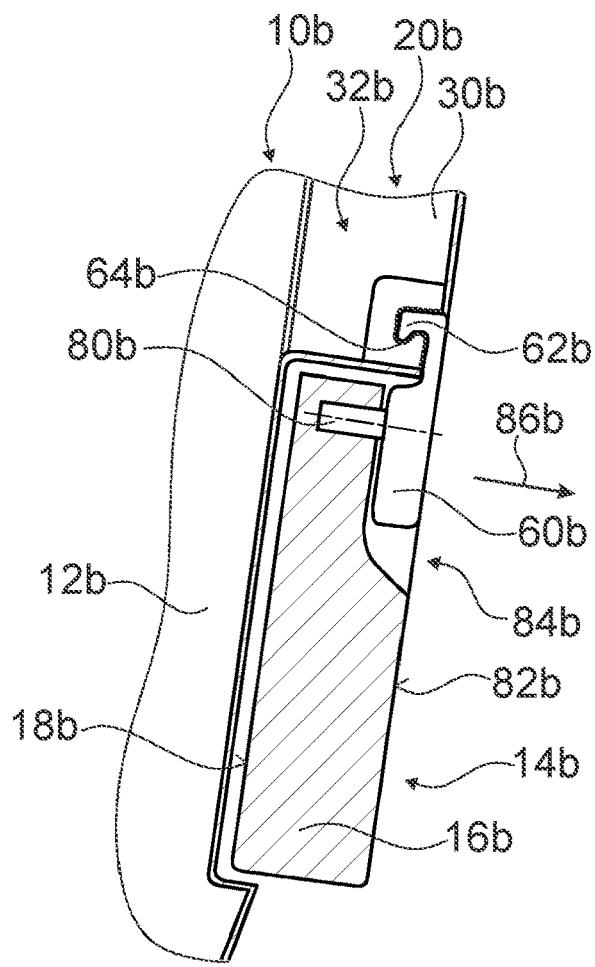
FIG. 6 shows a first sectional view through the table unit and a locking module in a central region.
Figure 7:
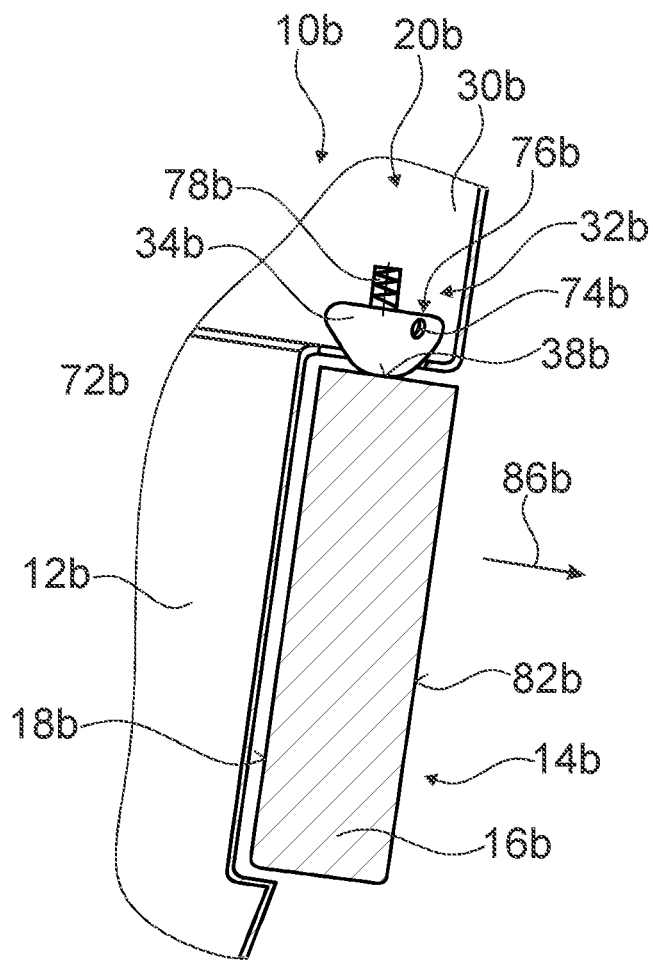
FIG. 7 shows a first sectional view through the table unit and the locking module in a peripheral region.
Figure 8:
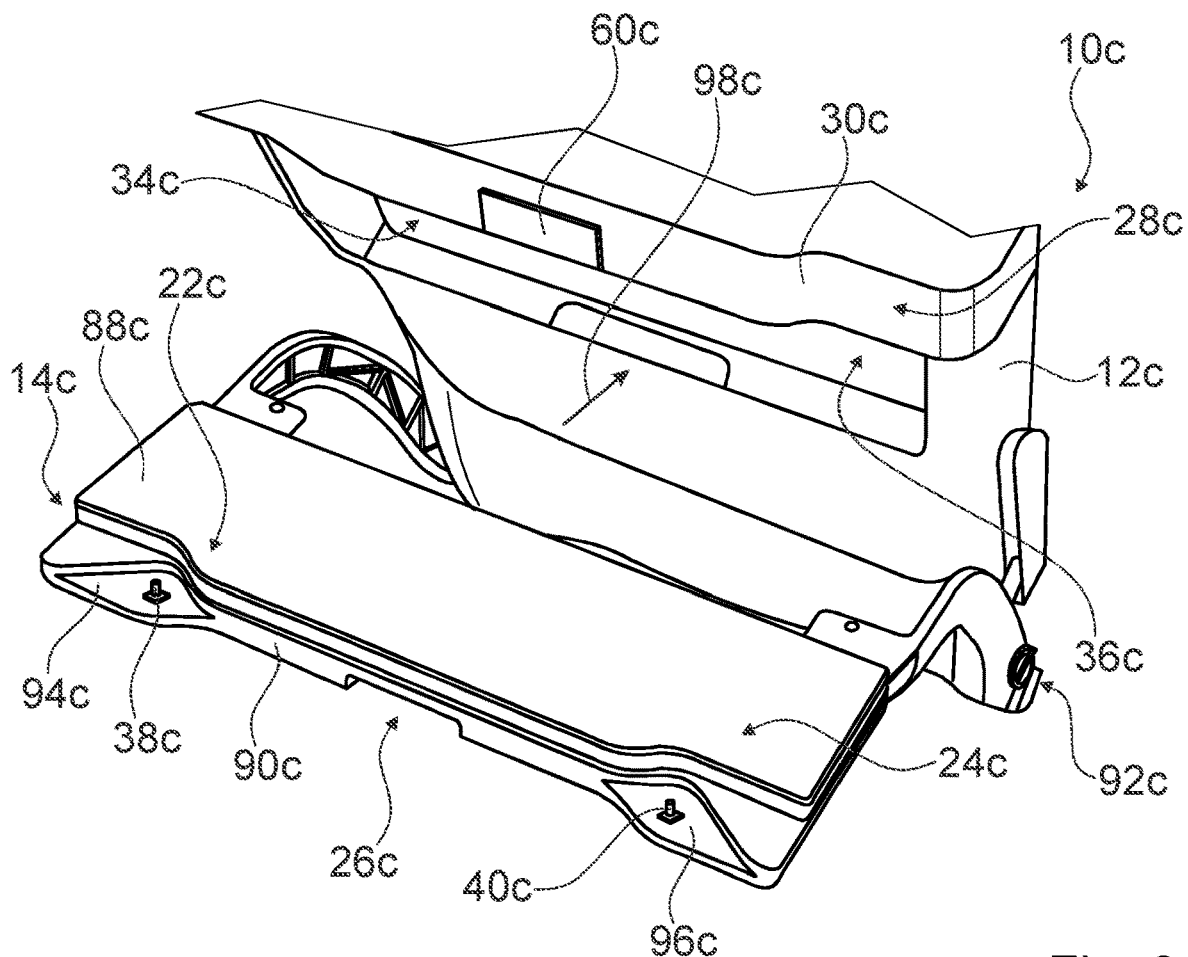
FIG. 8 shows a schematic illustration of a table device in a third exemplary embodiment, having a table unit in a use position.
Figure 9:
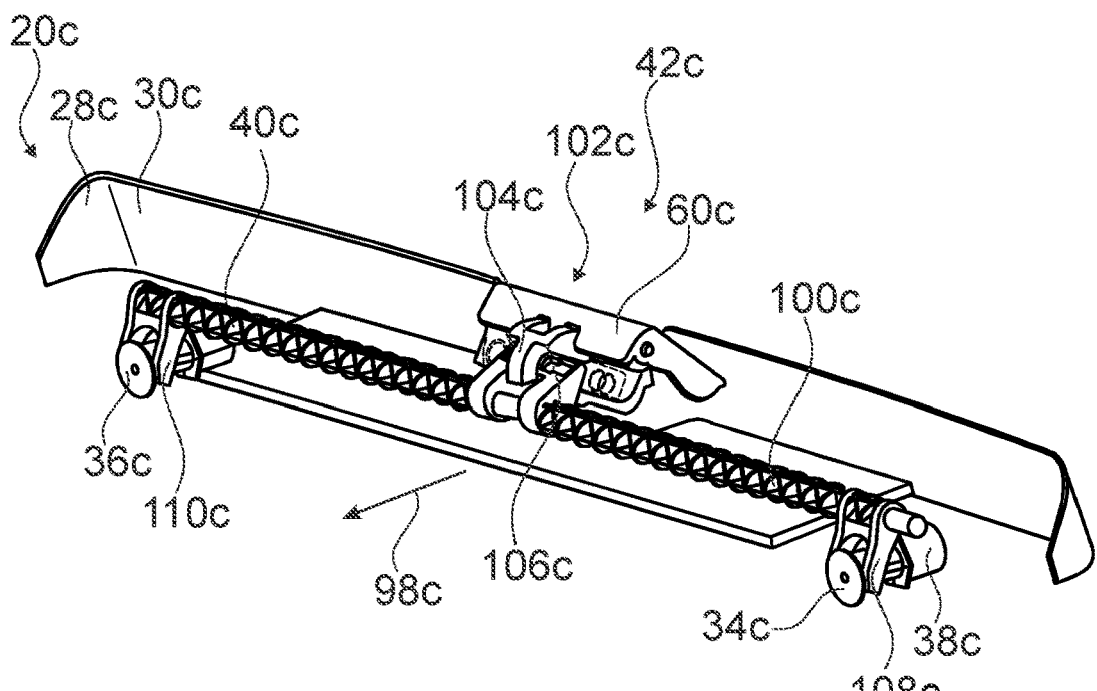
FIG. 9 shows a schematic illustration of a locking module of the table device in a locked state.
Figure 10:
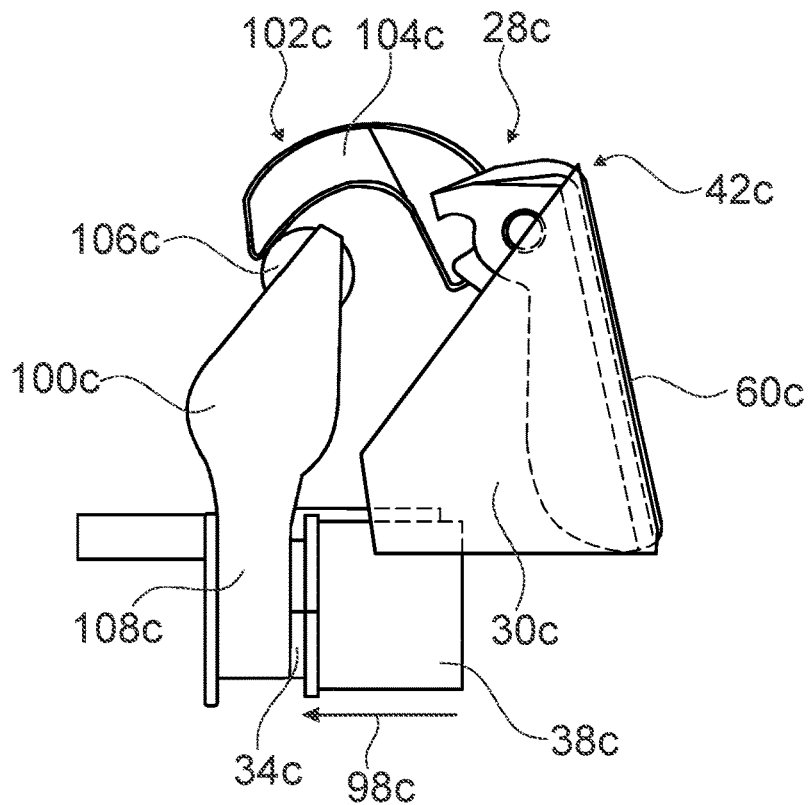
FIG. 10 shows a schematic detailed view of the locking module of the table device in a locked state.

FIGS. 4 to 6 show a table device for a seat 10b in a second exemplary embodiment. The seat 10b has a seat component 12b. The seat component 12b is realized as a back rest. The table device comprises a table unit 14b. The table unit 14b is implemented by a base body 16b. The base body 16b implements a table base body. The table unit 14b has a table surface 18b. The table surface 18b is implemented as a surface of the base body 16b. The table unit 14b is coupled to the seat 10b by way of a pivot bearing. The table unit 14b is adjustable between a stowage position and a use position. The table unit 14b is in particular pivotable between the use position and the stowage position by way of the bearing module. The table unit 14b in the use position by way of a table surface 18b of the table unit 14b is aligned so as to be substantially parallel with an installation plane. The table unit 14b in the stowage position is folded against the seat component 12b and cannot be utilized for placing items.

The table device comprises a locking module 20b. The locking module 20b is configured for fixing the table unit 14b in the stowage position thereof on the seat component 12b. The locking module 20b has a locked state in which the locking module 20b locks the table unit 14b in the stowage position thereof. The locking module 20b has an unlocked state in which the locking module 20b releases the table unit 14b such that said table unit 14b can be moved out of the stowage position. The locking module 20b is in particular configured for coupling the table unit 14b to the seat component 12b in two opposite peripheral regions 22b, 24b. The locking module 20b is configured for additionally coupling the table unit 14b to the seat component 12b in a central region 26b. The table unit 14b by means of the locking module 20b is fixedly coupled to the seat component 12b at three positions. On account thereof, particularly stable fixing of the table unit 14b on the seat component 12b can be achieved.

The locking module 20b has an attachment unit 28b. The attachment unit 28b is fixedly connected to the seat component 12b. The attachment unit 28b has a housing 30b. The housing 30b is formed by a base body. The housing 30b defines an internal space 32b. The internal space 32b of the housing 30b of the attachment unit 28b is provided so that components of the locking module 20b are disposed and/or supported in said internal space 32b. The attachment unit 28b is rigidly connected to the seat component 12b. The housing 30b of the attachment unit 28b is fixedly connected to the seat component 12b. The housing 30b of the attachment unit 28b is in particular connected to a supporting structure of the seat component 12b.

The attachment unit 28b is provided so that the table unit 14b in the stowage position thereof is able to be attached to the attachment unit 28b. The attachment unit 28b is disposed above the table unit 14b. The attachment unit 28b in the stowage position of the table unit 14b is disposed above the table unit 14b. An upper end of the table unit 14b in the stowage position is contiguous to a lower end of the attachment unit 28. A lower edge 68b of the attachment unit 28b in the stowage position of the table unit 14b is implemented so as to be congruent with a front edge 70b of the table unit 14b. The front edge of the table unit 14b in the stowage position faces the lower edge of the attachment unit 28b. In the stowage position of the table unit 14b, a transition between the table unit 14b and the attachment unit 28b is smooth.

The locking module 20b comprises two force-fit elements 34b, 36b. The force-fit elements 34b, 36b are configured for attaching in a force-fitting manner the table unit 14b to the attachment unit 28b. The table unit 14b in the locked state is coupled in a force-fitting manner to the attachment unit 28b by means of the force-fit elements 34b, 36b. The force-fit elements 34b, 36b are disposed in outer peripheral regions of the attachment unit 28b, said peripheral regions being in each case disposed so as to be congruent with one of the outer peripheral regions 22b, 24b of the table unit 14b. The force-fit elements 34b, 36b are embodied as cams which for locking the table unit 14b are configured for fixing the table unit 14b by way of a friction fit. The force-fit elements 34b, 36b embodied as cams have in each case one friction-fit face 72b. The friction-fit faces 72b of the force-fit elements 34b, 36b embodied as cams have a radiused profile. It is conceivable herein that the friction-fit faces 72b have a uniformly curved profile, or that the friction-fit faces 72b in different sub-regions have dissimilarly heavily curved profiles. The friction-fit faces 72b have a main holding region which in a stowage position of the table unit 14b in a locked state of the locking module 20b substantially realizes frictional contact with the table unit 14b. The main holding region of the friction-fit faces 72b herein can be implemented so as to be flattened. On account thereof, a particularly advantageously large region can be provided in which the friction-fit faces 72b of the force-fit elements 34b, 36b that are embodied as cams are in frictional contact with the table unit 14b in the locked state. The force-fit elements 34b, 36b on the friction-fit faces 72b thereof have a special coating which has a particularly advantageously high coefficient of friction such that a holding force which is formed by a friction-fit between the force-fit elements 34b, 36b and the table unit 14b is particularly high.

The force-fit elements 34b, 36b embodied as cams are disposed in the lower region of the attachment unit 28b. The force-fit elements 34b, 36b are supported in a lower region of the housing 30b of the attachment unit 28b. The force-fit elements 34b, 36g in part protrude beyond the lower edge 68b of the attachment unit 28b. The force-fitting elements 34b, 36b, in particular by way of the friction-fit faces 72b, protrude beyond the lower edge 68b of the attachment unit 28b. The force-fit elements 34b, 36b embodied as cams are supported so as to be pivotable in the attachment unit 28b. The force-fit elements 34b, 36b by way of a pivot bearing 74b are supported so as to be pivotable in the housing 30b of the attachment unit 28b. The force-fit elements 34b, 36b are supported so as to be eccentrically pivotable. The pivot bearings 74b are disposed in a front region of the force-fit elements 34b, 36b. On account thereof, the force-fit elements 34b, 36b by way of a rear end which faces away from a front side 76b of the attachment unit 28b, can be pivoted downward in the event of a force acting in a corresponding manner on the force-fit elements 34b, 36b. On account of an eccentric pivoting of the force-fit elements 34b, 36b, a region of the friction-fit face 72b that is in frictional contact with the table unit 14b can advantageously be varied and, on account thereof, a holding force can in particular be varied, in particular be increased. The locking module 20b per force-fit element 34b, 36b has in each case one spring element 78b. The spring elements 78b exert a spring force on the force-fit elements 34b, 36b which is aligned downward, in particular in the direction of the table unit 14b. The spring elements 78b are implemented as compression springs. The spring elements 78b are disposed in the housing 30b. The spring elements 78b are in each case supported between the housing 30b and the respective force-fit element 34b, 36b. The spring elements 78b herein engage on the rear end of the force-fit elements 34b, 36b. The spring elements 78b are configured for pushing in each case the force-fit elements 34b, 36b by way of the rear ends thereof in the direction of the table unit 14b. The spring elements 78b are configured for increasing a contact pressure force, thus a normal force between the force-fit elements 34b, 36b and the table unit 14b so as to advantageously achieve a high holding force between the force-fit elements 34b, 36b and the table unit 14b.

The locking module 20b for coupling in a force-fitting manner to the force-fit elements 34b, 36b disposed in the attachment unit 28b has two force-fit elements 38b, 40b that are fixedly connected to the table unit 14b. The force-fit elements 38b, 40b of the table unit 14b are implemented so as to correspond to the force-fit elements 34b, 36b of the attachment unit 28b. The force-fit elements 38b, 40b of the table unit 14b are implemented as friction faces on the base body 16b of the table unit 14b. The force-fit elements 38b, 40b of the table unit 14b that are implemented as friction faces are attached to the front edge of the table unit 14b. The force-fitting elements 38b, 40b of the table unit 14b that are implemented as friction faces are disposed in the outer peripheral regions 22b, 24b of the table unit 14b. The force-fit elements 38b, 40b of the table unit 14b that are implemented as friction faces in the stowage position of the table unit 14b are aligned so as to be congruent with the force-fit elements 34b, 36b of the attachment unit 28b that are embodied as cams. The force-fit elements 38b, 40b of the table unit 14b that are implemented as friction faces in the stowage position of the table unit 14b are in frictional contact with the force-fit elements 34b, 36b of the attachment unit 28b that are embodied as cams. The force-fit elements 38b, 40b of the table unit 14b that are implemented as friction faces herein can have a special surface configured for a friction fit. In principle however, it is also conceivable that the force-fit elements 38b, 40b of the table unit 14b that are implemented as friction faces are formed by a surface property that is identical to the remaining part of the base body 16b of the table unit 14b.

The locking module 20b comprises an actuation element 60b. The actuation element 60b is configured for manual operation by a passenger. The actuation element 60b is configured for adjusting the locking module 20b between the unlocked position thereof and the locked position thereof. An operator, in particular passenger, by manual operation of the actuation element 60b can adjust the locking module 20b between the locked position and the unlocked position. On account thereof, the passenger by an actuation of the actuation element 60b can selectively fix the table unit 14b in the stowage position on the seat component 12b or release said table unit 14b and then move the latter to the use position thereof. An operator can manually adjust the actuation element 60b between an actuation position and a non-actuation position. The actuation element 60b is realized as a rotary element. The actuation element 60b realized as a rotary element is attached to the table unit 14b by way of a rotary bearing 80b. The actuation element 60b by rotation about a rotation axis implemented by the rotary bearing 80b can be rotated between the actuation position and the non-actuation position. The actuation element 60b is attached to the table unit 14b. The actuation element 60b is disposed on a rear side 82b of the table unit 14b that lies opposite the table surface 18b. The table unit 14b on the rear side 82b thereof has a recess 84b in which the actuation element 60b is disposed. The actuation element 60b in an assembled state from the recess 84b does not protrude beyond a rear side 82b of the table unit 14b. On account thereof, the actuation element 60b can be particularly advantageously disposed, and a risk of injury on account of the actuation element 60b can in particular be minimized. The actuation element 60b is disposed in a front region of the table unit 14b. The actuation element 60b is attached so as to be centric on the table unit 14b.

The actuation element 60b has a form-fit element 62b. The form-fit element 62b is configured for being connected in a form-fitting manner to the attachment unit 28b. The form-fit element 62b in the actuation position of the actuation element 60b is connected in a form-fitting manner to the attachment unit 28b. The form-fit element 62b is disposed on a front end of the actuation element 60b. The form-fit element 62b is embodied as a hook element. The attachment unit 28b for coupling in a form-fitting manner to the form-fit element 62b of the actuation element 60b has a correspondingly implemented form-fit element 64b. The form-fit element 64b is implemented as an undercut which is implemented so as to correspond to the form-fit element 62b embodied as a hook element. The form-fit element 64b implemented as an undercut has a curved guide track. The curved guide track of the form-fit element 64b, in lateral regions in which the form-fit element 62b embodied as a hook element initially engages when coupling, is disposed closer to the rotation axis of the actuation element 60b than in a central region. The form-fit element 62b in the actuation position of the actuation element 60b is disposed in the central region of the form-fit element 64b.

On account of the curved guide track of the form-fit element 64b of the attachment unit 28b, the actuation element 60b when coupling to the attachment unit 28b is moved upward relative to the attachment unit 28b, in the direction of the attachment unit 28b. On account thereof, the table unit 14b coupled to the actuation element 60b is moved relative to the attachment unit 28b. The actuation element 60b when coupling to the attachment unit 28b is configured for initiating a relative movement between the table unit 14b and the attachment unit 28b. The relative movement herein is in particular realized as a movement of the table unit 14b in the direction of the attachment unit 28b. A gap between the table unit 14b and the attachment unit 28b is advantageously decreased on account of the movement of the table unit 14b relative to the attachment unit 28b. The force-fit elements 38b, 40b implemented by the table unit 14b are likewise advantageously moved in the direction of the force-fit elements 34b, 36b of the attachment unit 28b on account of the relative movement. The force-fit elements 34b, 36b by way of the friction-fit faces 72b thereof come into contact with the force-fit elements 38b, 40b of the table unit 14b on account of the movement of the table unit 14b relative to the attachment unit 28b. The force-fit elements 38b, 40b of the table unit 14b are pushed against the force-fit elements 34b, 36b of the attachment unit 28b on account of the movement of the table unit 14b relative to the attachment unit 28b. The table unit 14b by way of the force-fit elements 38b, 40b thereof, on account of the relative movement herein, deflects the force-fit elements 34b, 36b of the attachment unit 28b upward, counter to the spring force of the spring element 78b. The spring elements 78b generate a counterforce which increases a normal force between the force-fit elements 34b, 36b of the attachment unit 28b and the force-fit elements 38b, 40b of the table unit 14b.

On account of an adjustment of the actuation element 60b from the non-actuation position thereof to the actuation position thereof while the table unit 14b is situated in the stowage position thereof, the form-fit element 62b of the actuation element 60b engages in a form-fitting manner in the corresponding form-fit element 64b of the attachment unit 28b, and thus locks the table unit 14b so as to be centric to the attachment unit 28b. On account of the movement of the table unit 14b relative to the attachment unit 28b, the force-fit elements 34b, 36b of the attachment unit 28b are simultaneously brought into a force-fitting contact with the correspondingly implemented force-fit elements 38b, 40b of the table unit 14b, and on account thereof in the peripheral regions 22b, 24b lock the table unit 14b to the attachment unit 28b. On account thereof, the table unit 14b by the adjustment of the one actuation element 60b from the non-actuation position thereof to the actuation position thereof, when the table unit 14b is disposed in the stowage position thereof, in a central region 26b can advantageously be locked in a form-fitting manner to the attachment unit 28b and in the two peripheral regions 22b, 24b advantageously be locked in a force-fitting manner to the attachment unit 28b.

The locking module 20b in the locked state is configured for increasing a holding force between the table unit 14b and the attachment unit 28b when a force acting on the table unit 14b in an opening direction 86b of the table unit 14b engages on the table unit 14b. On account thereof, the holding force between the table unit 14b counter to an opening movement of the table unit 14b can advantageously be implemented so as to be self-reinforcing when the table unit 14b is locked in the stowage position. The force-fit elements 34b, 36b embodied as cams in the event of a force acting on the table unit 14b in the opening direction 84b of the table unit 14b are configured for increasing the friction fit by way of self-reinforcement. To this end, the force-fit elements 34b, 36b embodied as cams in an opening movement of the table unit 14b in the opening direction 84b are configured for being pivoted. On account of the eccentric support of the force-fit elements 34b, 36b by way of the pivot bearing 74b thereof, the friction-fit faces 72b of the force-fit elements 34b, 36b are displaced toward the force-fit elements 38b, 40b such that a higher friction force is created between the force-fit elements 34b, 36b of the attachment unit 28b and the force-fit elements 38b, 40b of the table unit 14b. On account thereof, the table unit 14b in the locked state of the locking module 20b can be advantageously secured in relation to a movement in the opening direction 86b.

FIGS. 7 to 10 show a table device for a seat 10c in a third exemplary embodiment. The seat 10c has a seat component 12c. The seat component 12c is realized as a back rest. The table device comprises a table unit 14c. The table unit 14c is implemented by two mutually pivotable base bodies 88c. 90c. The base bodies 88c, 90c conjointly implement the table base body. The base bodies 88c, 90c in a folded-out state configure a table surface 18c. In a folded-in-state, the surfaces of the two base bodies 88c, 90c which implement the table surface 18c are folded against one another. The table unit 14c is coupled to the seat 10c by way of the pivot bearing 92c. The table unit 14c is adjustable between a stowage position and a use position. The table unit 14c is in particular pivotable between the use position and the stowage position by way of a bearing module. The table unit 14c in the use position by way of a table surface of the table unit 14c is aligned so as to be substantially parallel with an installation plane. The table unit 14c in the stowage position is folded against the seat component 12c and cannot be utilized for placing items.

The table device comprises a locking module 20c. The locking module 20c is configured for fixing the table unit 14c in the stowage position thereof on the seat component 12c. The locking module 20c has a locked state in which said locking module 20c locks the table unit 14c in the stowage position thereof. The locking module 20c has an unlocked state in which said locking module 20c releases the table unit 14c such that the latter can be moved out of the stowage position. The locking module 20c is in particular configured for fixing the table unit 14c on the seat component 12c such that the table unit 14c is securely fixed on the seat component 12c even in the event of a crash. To this end, the locking module 20c is configured for coupling the table unit 14c to the seat component 12c in a plurality of positions. The locking module 20c is in particular configured for coupling the table unit 14c to the seat component 12c in two opposite peripheral regions 22c, 24c.

The locking module 20c has an attachment unit 28c. The attachment unit 28c is fixedly connected to the seat component 12c. In principle, it is also conceivable that the attachment unit 28c is at least partially or completely implemented by the seat component 12c. The attachment unit 28c has a housing 30c. The housing 30c is formed by a base body. The housing 30c is formed by a base shell and a cover plate. The housing 30c defines an internal space 32c. The internal space 32c of the housing 30c of the attachment unit 28c is provided so that components of the locking module 20c are disposed and/or supported in said internal space 32c. The attachment unit 28c is rigidly connected to the seat component 12c. The attachment unit 28c is provided so that the table unit 14c in the stowage position thereof is able to be attached to the attachment unit 28c. The attachment unit 28c is at least in part disposed above the table unit 14c. The attachment unit 28c in the stowage position of the table unit 14c is disposed above the table unit 14c. Part of the attachment unit 28c in the stowage position of the table unit 14c is disposed between the table unit 14c and the seat component 12c.

The table unit 14c in the stowage position thereof is lockable to the attachment unit 28c. The table unit 14c is able to be fixedly locked to the seat component 12c by way of the attachment unit 28c which is fixedly connected to the seat component 12c. The locking module 20c comprises two form-fit elements 34c, 36c. The form-fit elements 34c, 36c are configured for attaching in a form-fitting manner the table unit 14c to the attachment unit 28c. The table unit 14c in the locked state is coupled in a form-fitting manner to the attachment unit 28c by means of the form-fit elements 34c, 36c. The form-fit elements 34c, 36c are disposed in outer peripheral regions of the attachment unit 28c, said outer peripheral regions being in each case disposed so as to be congruent with one of the outer peripheral regions 22c, 24c of the table unit 14c. The form-fit elements 34c, 36c are implemented as form-fit sleeves. The form-fit elements 34c, 36c are implemented as tension sleeves. The form-fit elements 34c, 36c herein are implemented as form-fit sleeves known from the prior art and therefore are to be described here only briefly in terms of the basic function thereof. The form-fit elements 34*c*, 36*c* have an accommodation region, and in that the accommodation region have latching elements which are elastically adjustable in an outward manner. The latching elements of the form-fit elements 34*c*, 36*c* are realized as gripping elements. The latching elements herein are disposed in a front region of the form-fit elements 34*c*, 36*c*. The latching elements define an opening of the form-fit elements 34*c*, 36*c*. The latching elements in a state of normal operation, implement a first opening cross section of the form-fit elements 34*c*, 36*c*. The latching elements from the state of normal operation can be deflected outward, counter to a spring force, so as to enlarge an opening cross section of the form-fit elements 34*c*, 36*c*. It is conceivable herein that the latching elements are deflected counter to a spring force of a spring, for example an annular spring, or that the latching elements per se are elastically deformed. Correspondingly implemented form-fit elements, which have in particular an undercut, can be introduced in a coupling direction 98*c* of the form-fit elements 34*c*, 36*c* on account of the deflection of the latching elements. The correspondingly implemented form-fit elements herein can engage behind the latching elements of the form-fit elements 34*c*, 36*c* when the former on account of the spring loading latch behind a wide cross section of the introduced form-fit elements.

The locking module 20*c* for coupling in a form-fitting manner to the form-fit elements 34*c*, 36*c* disposed in the attachment unit 28*c* has two form-fit elements 38*c*, 40*c* that are fixedly connected to the table unit 14*c*. The form-fit elements 38*c*, 40*c* of the table unit 14*c* are implemented so as to correspond to the form-fit elements 34*c*, 36*c* of the attachment unit 28*c*. The form-fit elements 38*c*, 40*c* of the table unit 14*c* are embodied as pin elements. The form-fit elements 38*c*, 40*c* embodied as pin elements herein in a front region implement in each case one wide head region. The wide head regions of the form-fit elements 38*c*, 40*c* are configured for engaging in a form-fitting manner in the form-fit elements 34*c*, 36*c* implemented as form-fit sleeves. The wide head regions herein are implemented so as to be arrow-shaped. In principle, it is also conceivable that the wide head regions of the form-fit elements 38*c*, 40*c* implement in each case a spherical shape. The form-fit elements 38*c*, 40*c* embodied as pin elements are attached to the base body 90*c* of the table unit 14*c*. The form-fit elements 38*c*, 40*c* are disposed on a surface of the base body 90*c* that also implements the table surface 18*c*. For arranging the form-fit elements 38*c*, 40*c* which are embodied as pins, recesses 94*c*, 96*c* are incorporated in the surface of the base body 90*c* that implements the table surface 18*c*. The form-fit elements 38*c*, 40*c* embodied as pins herein extend so as to be parallel with a normal direction that is perpendicular to the table surface 18*c*. The form-fit elements 38*c*, 40*c* herein do not protrude beyond a plane which is defined by the table surface 18*c*.

The form-fit elements 34*c*, 36*c*, 38*c*, 40*c* are configured for coupling the table unit 14*c* to the attachment unit 28*c* by way of a form-fitting connection that is releasable in the opening direction 86*c* of the table unit 14*c*. The form-fit elements 38*c*, 40*c* of the table unit 14*c* and the form-fit elements 34*c*, 36*c* of the attachment unit 28*c* herein are able to be connected to one another in a form-fitting manner and be separated from one another again along a coupling direction 98*c* which runs so as to be parallel with an opening direction 86*c* of the table unit 14*c*. The form-fit elements 34*c*, 36*c* of the attachment unit 28*c* are supported in the housing 30*c* of the attachment unit 28*c* so as to be displaceable along the coupling direction 98*c*. In order for the form-fitting connection between the form-fit elements 38*c*, 40*c* of the table unit 14*c* and the form-fit elements 34*c*, 36*c* of the attachment unit 28*c* to be separated, the form-fit elements 34*c*, 36*c* are moved counter to the coupling direction 98*c*. In order for the form-fitting connection between the form-fit elements 38*c*, 40*c* of the table unit 14*c* and the form-fit elements 34*c*, 36*c* of the attachment unit 28*c* to be separated, the form-fit elements 34*c*, 36*c* are in particular moved away from the table. The locking module 20*c* comprises an actuation mechanism 42*c*. The actuation mechanism 42*c* is configured for an actuation of the movably supported form-fit elements 34*c*, 36*c*. The actuation mechanism 42*c* is configured for adjusting the form-fit elements 34*c*, 36*c* between a release position and a locked position. The actuation mechanism 42*c* is disposed in the attachment unit 28*c*. The actuation mechanism 42*c* is configured for transmitting an actuation movement exerted thereon to the two form-fit elements 34*c*, 36*c* so as to actuate the latter, in particular so as to move the latter from the locked position thereof to the release position thereof. The actuation mechanism 42*c* comprises a rotation element 100*c*. The rotation element 100*c* is realized as a torsion bar. The rotation element 100*c* is supported so as to be rotatable in the internal space 32*c* of the housing. The rotation element 100*c* runs in a transverse direction. The rotation element 100*c* extends between both peripheral regions of the attachment unit 28*c*. The rotation element 100*c* extends from the one form-fit element 34*c* of the attachment unit 28*c* up to the opposite form-fit element 36*c* of the attachment unit 28*c*. The rotation element 100*c* at a first end is coupled to the one form-fit element 34*c*. The rotation element 100*c* at a second end is coupled to the other form-fit element 36*c*. The rotation element 100*c* is in each case coupled in a form-fitting manner to the form-fit elements 34*c*, 36*c*. The coupling of the form-fit elements 34*c*, 36*c* to the rotation element 100*c*, in an axial movement of the form-fit elements 34*c*, 36*c* in or counter to the coupling direction 98*c*, is configured for causing a rotation movement of the rotation element 100*c*. The rotation element 100*c* for coupling to the form-fit elements 34*c*, 36*c* per form-fit element 34*c*, 36*c* has one lever element 108*c*, 110*c*. The lever elements 108*c*, 110*c* transmit a rotation movement of the rotation element 100*c* to the form-fit elements 34*c*, 36*c* and on account thereof move said form-fit elements 34*c*, 36*c* counter to the coupling direction 98*c*. The lever elements 108*c*, 110*c* are configured for actively pulling the form-fit elements 34*c*, 36*c*, 38*c*, 40*c* from the locked position thereof, thus from a form-fitting connection to one another.

The locking module 20*c* comprises an actuation element 60*c*. The actuation element 60*c* is configured for manual operation by a passenger. The actuation element 60*c* is configured for adjusting the locking module 20*c* between the unlocked position thereof and the locked position thereof. The actuation element 60*c* is implemented as a pivotable lever element. The actuation element 60*c* is attached to the attachment unit 28*c*. The actuation element 60*c* is attached so as to be centric on the attachment unit 28*c*. The actuation element 60*c* when actuated is configured for rotating the rotation element 100*c*. The locking module 20*c* for coupling to the rotation element 100*c* has a coupling mechanism 102*c*. The coupling mechanism 102*c* has a hook element 104*c* which is fixedly connected to the actuation element 60*c*. The hook element 104*c* is conjointly pivoted upon actuation of the actuation element 60*c*. The coupling mechanism 102*c* has an driver element 106*c* which is fixedly coupled to the rotation element 100*c*. The driver element 106*c* is implemented as a rotatably supported roller. The hook element 104*c* engages in the driver element 106*c* implemented as a roller so as to adjust the latter (see FIG. 9 and FIG. 10). In an actuation of the actuation element 60c, the driver element 106c is displaced by the hook element 104c, on account of which the rotation element 100c is rotated such that the latter moves the movably supported form-fit elements 34c, 36c counter to the coupling direction 98c. If the form-fit elements 38c, 40c of the table unit 14c at this point in time are connected in a form-fitting manner to the form-fit elements 34c, 36c of the attachment unit 28c, the form-fit elements 34c, 36c of the attachment unit 28c are by means of the lever elements 108c, 110c pulled from a form-fitting connection to the form-fit elements 38c, 40c. The table unit 14c is unlocked and can be pivoted from the stowage position thereof to a use position. For coupling the form-fitting elements 38c, 40c of the table unit 14c to the form-fit elements 34c, 36c of the attachment unit 28c, the table unit 14c is simply pivoted to the stowage position thereof, on account of which the form-fit elements 34c, 36c, 38c, 40c are coupled to one another in the coupling direction 98c thereof and establish a form-fitting connection to one another.

An operator can manually adjust the actuation element 60c between an actuation position and a non-actuation position. The actuation element 60c in an actuation position actuates the actuation mechanism 42c to the actuated position thereof and rotates the rotation element 100c such that the form-fit elements 34c, 36c are moved counter to the coupling direction 98c. If the actuation element 60c is disposed in the non-actuation position thereof, said actuation element 60c does not actuate the actuation mechanism 42c and the latter is disposed in the non-actuated position thereof, wherein the rotation element 100c is not rotated and the form-fit elements 34c, 36c are disposed in the locked position thereof. The actuation element 60c is spring loaded by a spring element (not illustrated in more detail) by which the actuation element 60c is pushed to the non-actuation position thereof.

Figure 11:
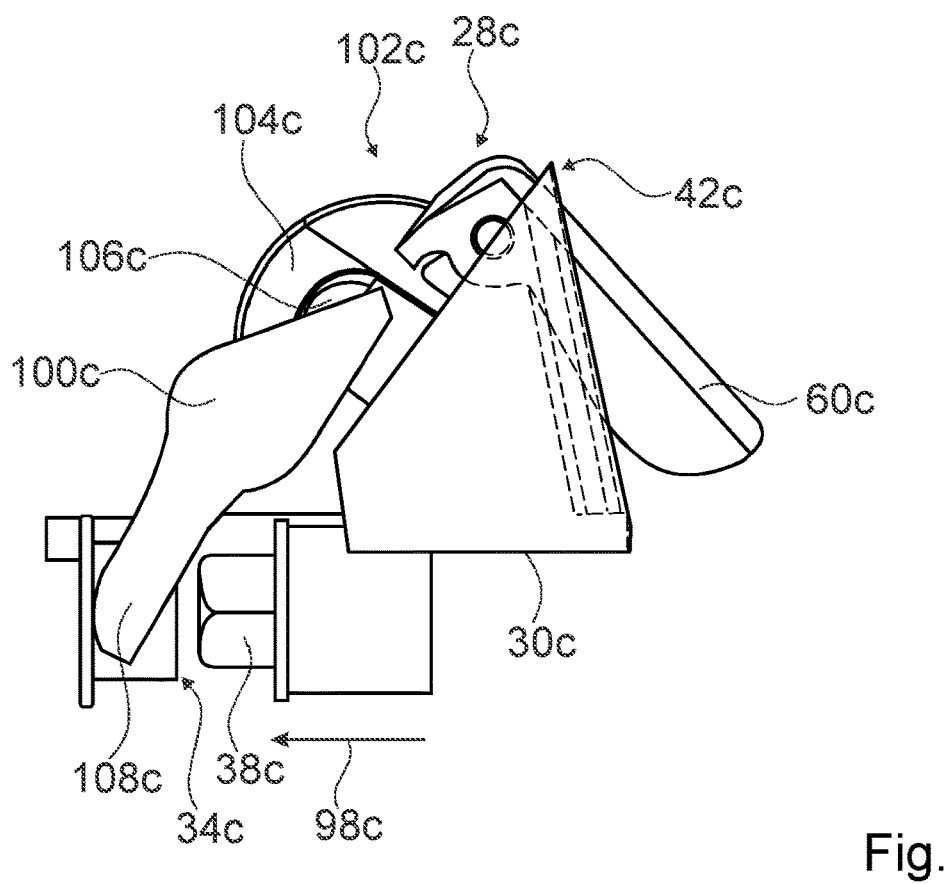
FIG. 11 shows a schematic detailed view of the locking module of the table device in an unlocked state.
Figure 12:
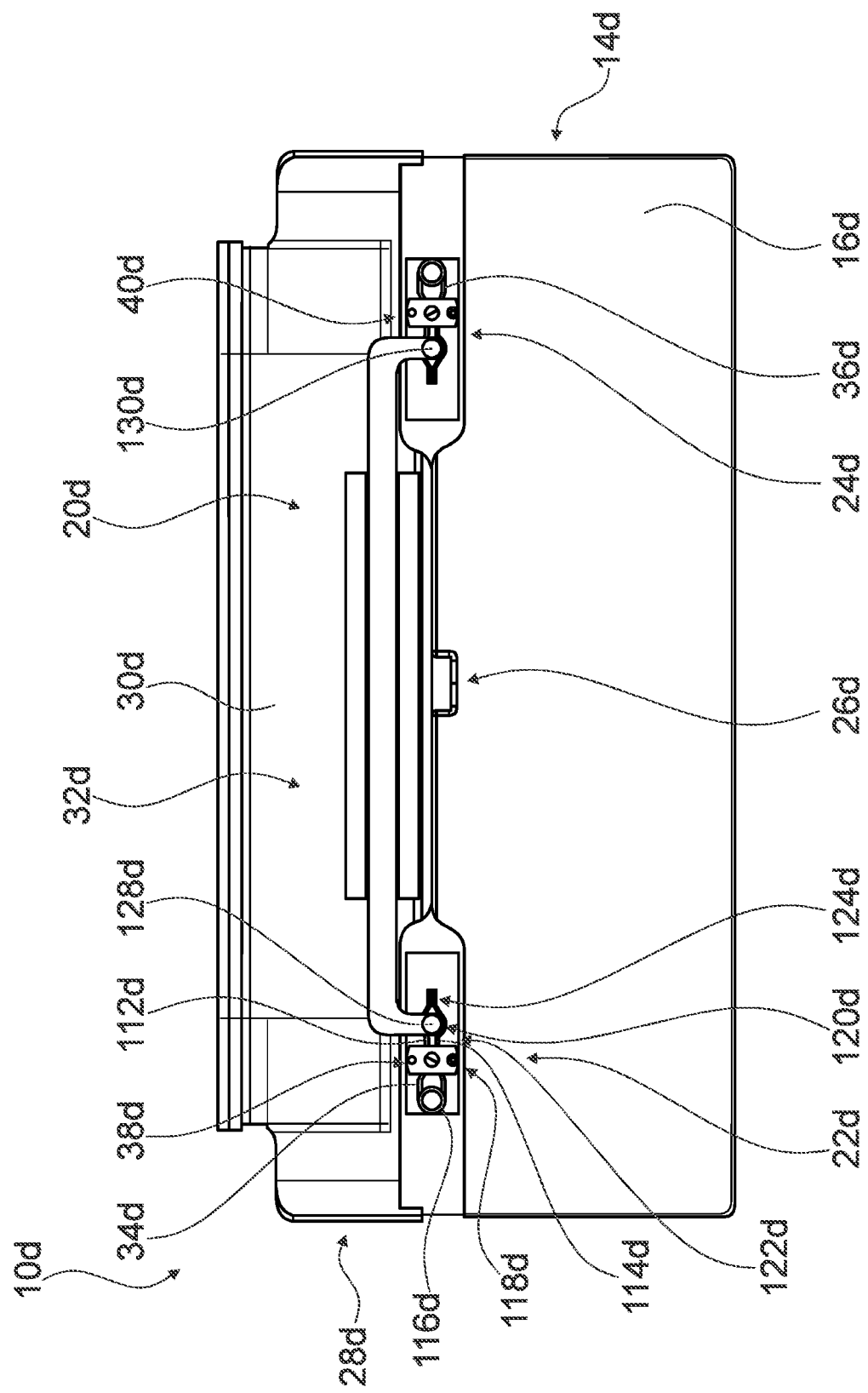
FIG. 12 shows a schematic illustration of a table device in a fourth exemplary embodiment, having a table unit in a stowage position and a locking module in a locked position.
Figure 13:
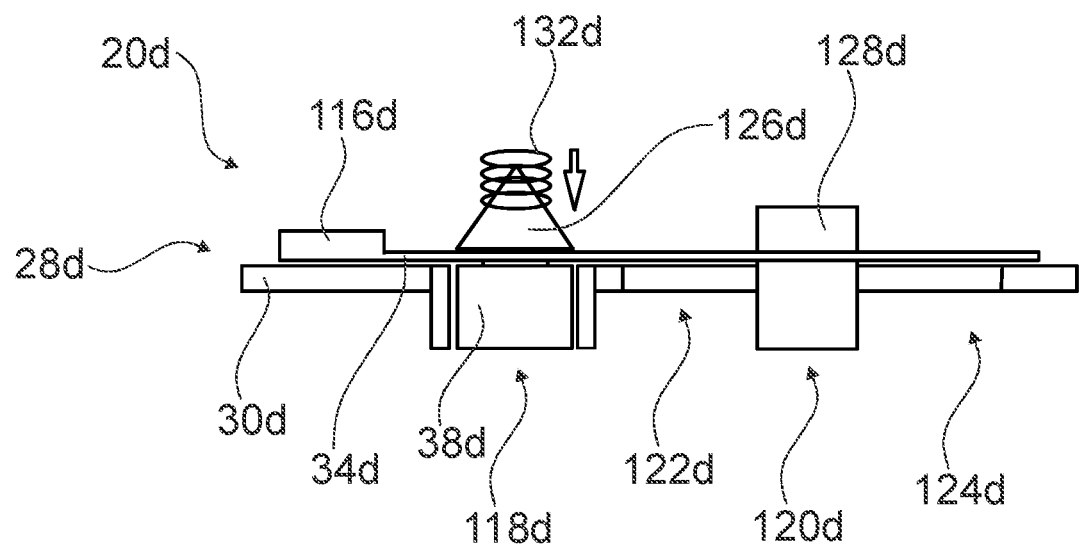
FIG. 13 shows a schematic illustration of part of the locking module in the locked state.
Figure 14:
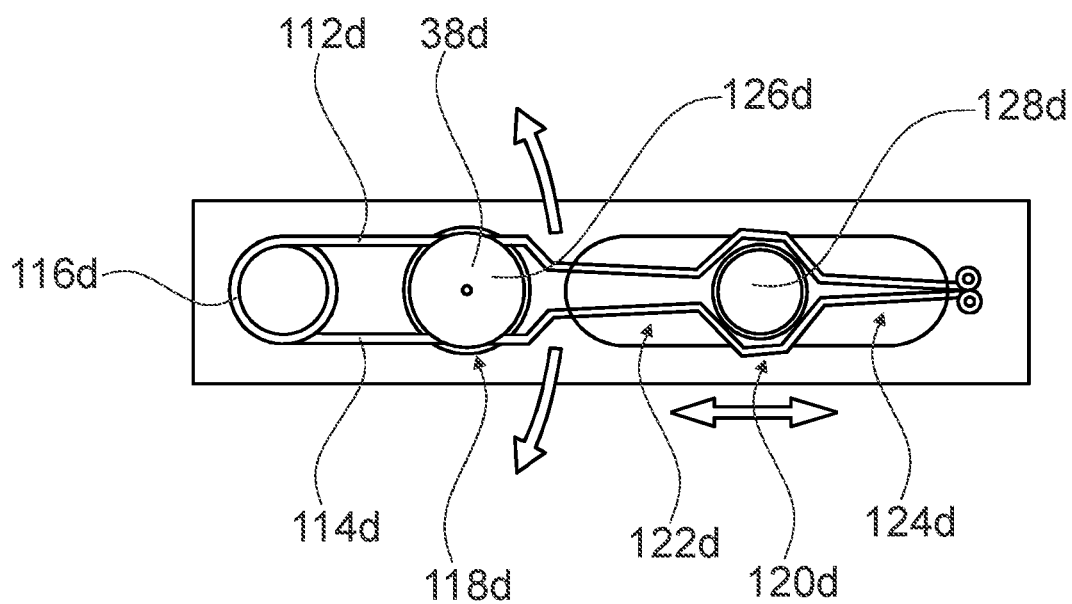
FIG. 14 shows a further schematic illustration of part of the locking module in the locked state.

FIGS. 11 to 13 show a table device for a seat 10d in a fourth exemplary embodiment. The seat 10d has a seat component 12d. The seat component 12d is realized as a back rest. The table device comprises a table unit 14d. The table unit 14d is implemented by a base body 16d. The base body 16d implements a table base body. The table unit 14d has a table surface 18d. The table surface 18d is embodied as a surface of the base body 16d. The table unit 14d is coupled to the seat 10d by way of a pivot bearing. The table unit 14d is adjustable between a stowage position and a use position. The table unit 14d is in particular pivotable between the use position and the stowage position by way of a bearing module. The table unit 14d in the use position, by way of a table surface 18d of the table unit 14d, is aligned so as to be substantially parallel with an installation plane. The table unit 14d in the stowage position is folded against the seat component 12d and cannot be utilized for placing items.

The table device comprises a locking module 20d. The locking module 20d is configured for fixing the table unit 14d in the stowage position thereof on the seat component 12d. The locking module 20d has a locked state in which the locking module 20d locks the table unit 14d in the stowage position thereof. The locking module 20d has an unlocked state in which the locking module 20d releases the table unit 14d such that the latter can be moved out of the stowage position. The locking module 20d is in particular configured for fixing the table unit 14d to the seat component 12d such that the table unit 14d is securely fixed to the seat component 12d even in the event of a crash. To this end, the locking module 20d is configured for coupling the table unit 14d to the seat component 12d in a plurality of positions. The locking module 20d is in particular configured for coupling the table unit 14d to the seat component 12d in two opposite peripheral regions 22d, 24d.

The locking module 20d has an attachment unit 28d. The attachment unit 28d is fixedly connected to the seat component 12d. In principle, it is also conceivable that the attachment unit is at least partially or completely implemented by the seat component 12d. The attachment unit 28d has a housing 30d. The housing 30d is formed by a base body. The housing 30d is formed by a base shell and a cover plate. The housing 30d defines an internal space 32d. The internal space 32d of the housing 30d of the attachment unit 28d is provided so that components of the locking module 20d are disposed and/or supported in said internal space 32d. The attachment unit 28d is rigidly connected to the seat component 12d. The attachment unit 28d is provided so that the table unit 14d in the stowage position thereof is able to be attached to the attachment unit 28d. The attachment unit 28d is at least in part disposed above the table unit 14d. The attachment unit 28d in the stowage position of the table unit 14d is disposed above the table unit 14d. Part of the attachment unit 28d in the stowage position of the table unit 14d is disposed between the table unit 14d and the seat component 12d.

The table unit 14d in the stowage position thereof is lockable to the attachment unit 28d. The table unit 14d is able to be fixedly locked to the seat component 12d by way of the attachment unit 28d which is fixedly connected to the seat component 12d. The locking module 20d comprises two form-fit elements 34d, 36d. The form-fit elements 34d, 36d are configured for connecting in a form-fitting manner the table unit 14d to the attachment unit 28d. The table unit 14d in the locked state is coupled in a form-fitting manner to the attachment unit 28d by means of the form-fit elements 34d, 36d. The form-fit elements 34d, 36d are disposed in outer peripheral regions of the attachment unit 28d, said outer peripheral regions being in each case disposed so as to be congruent with one of the outer peripheral regions 22d, 24d of the table unit 14d. The form-fit elements 34d, 36d are realized as spring elements. The form-fit elements 34d, 36d are realized as leg springs. In principle, it would also be conceivable that the form-fit elements 34d, 36d are realized as leaf springs considered expedient by the person skilled in the art. The form-fit elements 34d, 36d are realized as twisted wire springs which have in each case two spring legs 112d, 114d which project from a twisted region 116d. The spring legs 112d, 114d in the unstressed state in dissimilar regions have dissimilar mutual spacings which can be enlarged on account of elastic deformation. The spring legs 112d, 114d have in each case a mutually mirror-symmetrical contour. The form-fit elements 34d, 36d are of substantially identical implementation, which is why only the form-fit element 34d is to be described in more detail hereunder. The description can be applied to the other form-fit element 36d. The form-fit element 34d has a coupling region 118d. The spring legs 112d, 114d in the coupling region 118d have a first mutual spacing. The coupling region 118d is provided so that a correspondingly implemented form-fit element between the two spring legs 112d, 114d can be connected in a form-fitting manner to the form-fit element 34d. The form-fit element 34d has an unlocking element region 120d. The two spring legs 112d, 114d in the unlocking element region 120d have a mutual spacing which is approximately as large as the spacing in the coupling region 118d. The unlocking element region 120d is disposed spaced apart from the coupling region 118*d*. The form-fit element 34*d* on both sides of the unlocking element region 120*d* has in each case one uncoupling region 122*d*, 124*d*. The two spring legs 112*d*, 114*d* in the uncoupling regions 122*d*, 124*d* are disposed directly adjacent to one another. The two spring legs 112*d*, 114*d* in the uncoupling regions 122*d*, 124*d* have a mutual spacing which is substantially smaller than the spacings in the coupling region 118*d* and the unlocking element region 120*d*. The uncoupling region 122*d* is disposed between the coupling region 118*d* and the unlocking element region 120*d*.

The locking module 20*d* for coupling in a form-fitting manner to the form-fit elements 34*d*, 36*d* disposed in the attachment unit 28*d* has two form-fit elements 38*d*, 40*d* that are fixedly connected to the table unit 14*d*. The form-fit elements 38*d*, 40*d* of the table unit 14*d* are implemented so as to correspond to the form-fit elements 34*d*, 36*d* of the attachment unit 28*d*. The form-fit elements 38*d*, 40*d* of the table unit 14*d* are embodied as pin elements. The form-fit elements 38*d*, 40*d* embodied as pin elements are attached to the base body of the table unit 14*d*. The form-fit elements 38*d*, 40*d* are disposed on a surface of the base body that also implements the table surface 18*d*. The form-fit elements 38*d*, 40*d* embodied as pins herein extend so as to be parallel with a normal direction that is perpendicular to the table surface of the table unit 14*d*. The form-fit elements 38*d*, 40*d* embodied as pin elements herein on a front region implement in each case a wide head region 126*d*. The wide head regions 126*d* of the form-fit elements 38*d*, 40*d* are configured for engaging in a form-fitting manner in the coupling regions 118*d* between the spring legs 112*d*, 114*d* of the form-fit elements 34*d*, 36*d*. The wide head regions 126*d* herein are implemented so as to be arrow-shaped. In principle, it is also conceivable that the wide head regions 126*d* are implemented so as to be spherical.

The form-fit elements 38*d*, 40*d* disposed in the table unit 14*d* for locking the table unit 14*d* are provided to be substantially encompassed by the form-fit elements 34*d*, 36*d* disposed in the attachment unit 28*d*. In order for the form-fit elements 38*d*, 40*d* of the table unit 14*d* to be unlocked from the form-fit elements 34*d*, 36*d* of the attachment unit 28*d*, the form-fit elements 34*d*, 36*d* are configured for being elastically deformed. The spring legs 112*d*, 114*d* of the form-fit elements 34*d*, 36*d* herein are elastically moved apart. On account thereof, the form fit elements 34*d*, 36*d* in the coupling regions 118*d* thereof release the form-fit elements 38*d*, 40*d* of the table unit 14*d*.

The locking module 20*d* for unlocking the form-fit elements 34*d*, 36*d* has one unlocking element 128*d*, 130*d* per form-fit element 34*d*, 36*d*. The unlocking elements 128*d*, 130*d* in a locked state are disposed in the unlocking element regions 120*d* of the form-fit elements 34*d*, 36*d*. The unlocking elements 128*d*, 130*d* have a diameter which is smaller than a spacing of the two spring legs 112*d*, 114*d* in the unlocking element regions 120*d* of the form-fit elements 34*d*, 36*d*. On account thereof, the unlocking elements 128*d*, 130*d* do not deflect the two spring legs 112*d*, 114*d* of the form-fit elements 34*d*, 36*d* outward when said two spring legs 112*d*, 114*d* are disposed in the unlocking element regions 120*d* of the form-fit elements 34*d*, 36*d*. The unlocking elements 128*d*, 130*d*, for unlocking the form-fit elements 34*d*, 36*d*, 38*d*, 40*d* from one another, are configured for elastically deforming the form-fit elements 34*d*, 36*d*. The unlocking elements 128*d*, 130*d*, for unlocking the form-fit elements 34*d*, 36*d*, 38*d*, 40*d* from one another, are configured for moving apart the spring legs 112*d*, 114*d* of the form-fit elements 34*d*, 36*d*. On account thereof, a spacing of the spring legs 112*d*, 114*d* of the form-fit elements 34*d*, 36*d* in the coupling regions 118*d* increases to the extent that the form-fit elements 38*d*, 40*d* of the table unit 14*d* that are embodied as pins can be released from the attachment unit 28*d*.

The locking module 20*d* comprises an actuation element 60*d*. The actuation element 60*d* is configured for manual operation by a passenger. The actuation element 60*d* is configured for adjusting the locking module 20*d* between the unlocked position thereof and the locked position thereof. An operator, in particular a passenger, by manually actuating the actuation element 60*d* can adjust the locking module 20*d* between the locked position and the unlocked position. An operator can manually adjust the actuation element 60*d* between an actuation position and a non-actuation position. On account thereof, the passenger by actuating the actuation element 60*d* can selectively fix the table unit 14*d* in the stowage position thereof on the seat component 12*d* or release said table unit 14*d*, and then move said table unit 14*d* to the use position thereof. The actuation element 60*d* is implemented as an axially displaceable lever. The actuation element 60*d* implemented as an axially displaceable lever herein is configured for being axially moved in a horizontal direction. In principle, it would also be conceivable that the actuation element 60*d* implemented as an axially displaceable lever is configured for being axially moved in a horizontal direction. The actuation element 60*d* is rigidly connected to the unlocking elements 128*d*, 130*d*. The unlocking elements 128*d*, 130*d* are fixedly disposed on opposite ends of the actuation element 60*d*. The actuation element 60*d* in the non-actuation position is centrically disposed. In the non-actuation position of the actuation element 60*d*, the unlocking elements 128*d*, 130*d* coupled to the actuation element 60*d* are disposed in the unlocking element regions 120*d* of the form-fit elements 34*d*, 36*d*. On account of an axial displacement of the actuation element 60*d*, the unlocking elements 128*d*, 130*d* are moved out of the unlocking element regions 120*d* into one of the uncoupling regions 122*d*, 124*d*, on account of which the unlocking elements 128*d*, 130*d* elastically deform, in particular push apart, the corresponding spring legs 112*d*, 114*d* of the form-fit elements 34*d*, 36*d*. On account thereof, the spring legs 112*d*, 114*d* of the form-fit elements 34*d*, 36*d* are pushed so far apart that a spacing in the coupling regions 118*d* is larger than the head regions 126*d* of the form-fit elements 38*d*, 40*d* of the table unit 14*d*. The table unit 14*d* is unlocked and can be pivoted out of the stowage position thereof to a use position. In order for a movement of the form-fit elements 38*d*, 40*d* of the table unit 14*d* out of the coupling regions 118*d* of the form-fit elements 34*d*, 36*d* to be facilitated, the locking module 20*d* per form-fit element 38*d*, 40*d* of the table unit 14*d* has one spring element 132*d* which is supported in the attachment unit 28*d* and exerts a spring force on the form-fit elements 38*d*, 40*d* that are disposed in the coupling regions 118*d* of the form-fit elements 34*d*, 36*d*, said spring force supporting an uncoupling movement of the form-fit elements 38*d*, 40*d*. In order for the form-fit elements 38*d*, 40*d* of the table unit 14*d* to be coupled to the form-fit elements 34*d*, 36*d* of the attachment unit 28*d*, the table unit 14*d* is simply pivoted to the stowage position thereof, on account of which the form-fit elements 38*d*, 40*d* are pushed into the coupling regions 118*d* of the form-fit elements 34*d*, 36*d*, between the spring legs 112*d*, 114*d*. The form-fit elements 38*d*, 40*d* herein elastically push apart the spring legs 112*d*, 114*d* by way of the head regions 126*d* thereof, the spring legs 112*d*, 114*d* snap in again behind the head regions 126*d*, on account of which the form-fit elements 34*d*, 36*d*, 38*d*, 40*d* are coupled to one another in a form-fitting manner.

Figure 15:
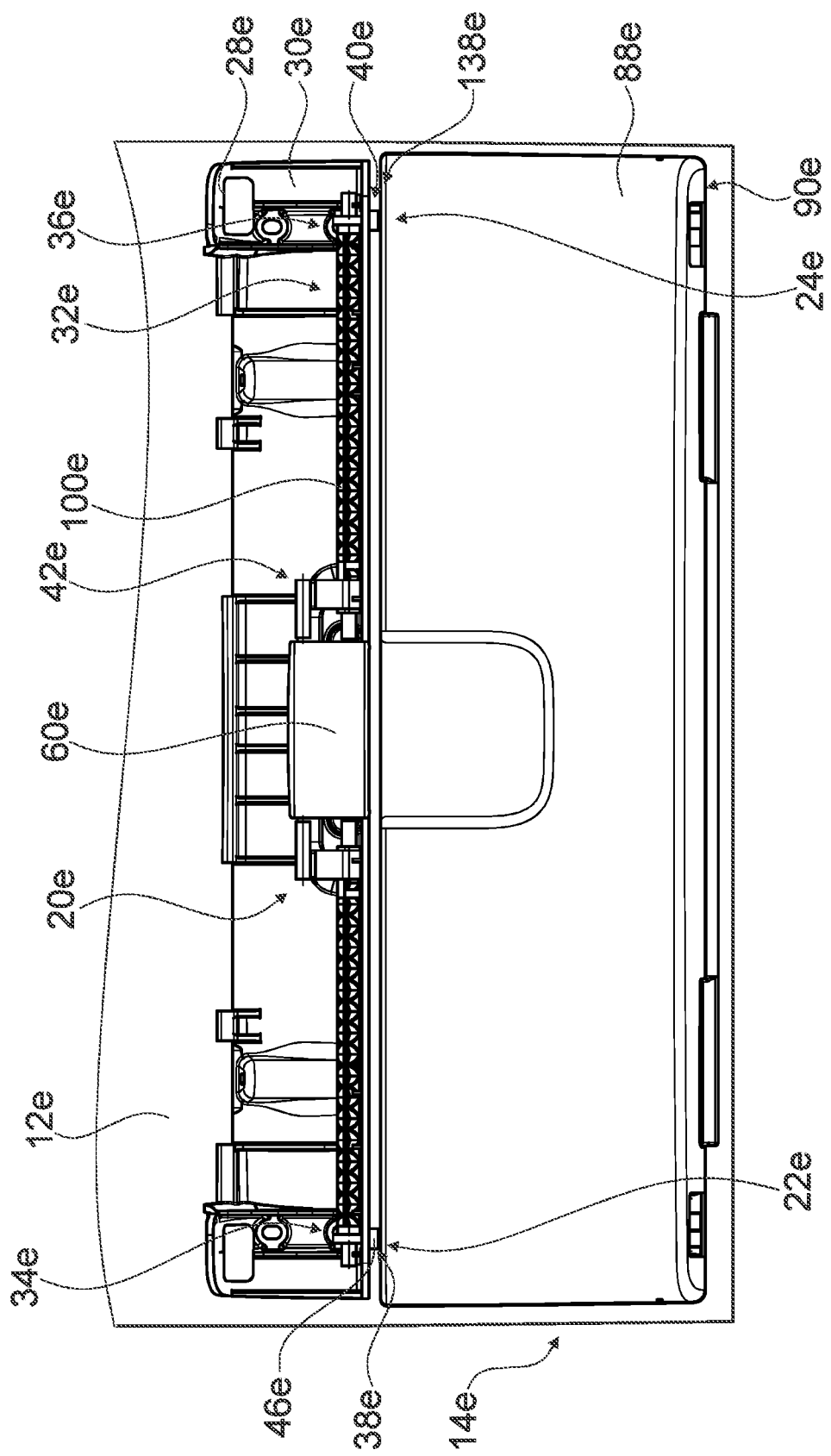
FIG. 15 shows a schematic illustration of a table device in a fifth exemplary embodiment, having a table unit in a stowage position and a locking module in a locked state.
Figure 16:
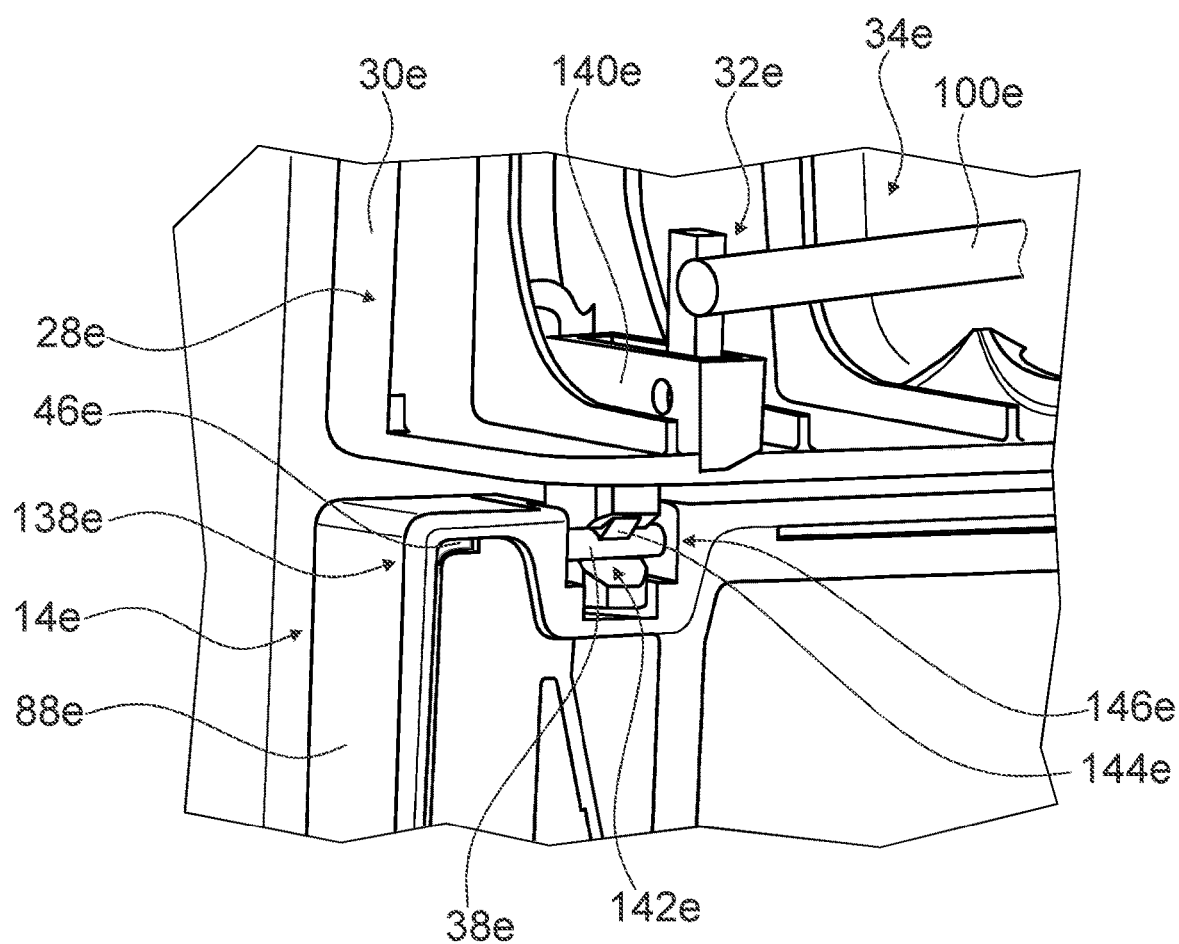
FIG. 16 shows a schematic illustration of the locking module having schematically illustrated form-fit elements.

FIGS. 15 and 16 show a table device for a seat 10*e* in a fifth exemplary embodiment. The seat 10*e* has a seat component 12*e*. The seat component 12*e* is realized as a back rest. The table device comprises a table unit 14*e*. The table unit 14*e* is implemented by two mutually pivotable base bodies 88*e*, 90*e*. The table device has a support unit 138*e* by way of which the two base bodies 88*e*, 90*e* are pivotably connected to one another. The support unit 138*e* has two bearing locations where the two base bodies 88*e*, 90*e* are pivotably connected to one another. The support unit 138*e* at the bearing locations per base body 88*e*, 90*e* has one articulation element 46*e* which is connected to the respective base body 88*e*, 90*e*. The articulation elements 46*e* are embodied as bearing pins. The two articulation elements 46 of the two base bodies 88*e*, 90*e* at one bearing location are connected to one another by way of coupling elements. The coupling elements are in each case pivotably attached to the articulation elements 46*e*. The two base bodies 88*e*, 90*e* are mutually pivotable by way of the articulation elements 46*e* and the coupling elements. In principle, it would also be conceivable that the support unit 138*e* has one or a plurality of long articulation elements which directly implement a bearing axle between the two base bodies 88*e*, 90*e*. The base bodies 88*e*, 90*e* conjointly implement a table base body. The base bodies 88*e*, 90*e* in a folded-out state implement a table surface. In a folded-in-state, the surfaces of the two base bodies 88*e*, 90*e* which implement the table surface are folded against one another. The table unit 14*e* is adjustable between a stowage position and a use position. The table unit 14*e* is in particular pivotable between the use position and the stowage position by way of a bearing module. The table unit 14*e* in the use position, by way of a table surface of the table unit 14*e*, is aligned so as to be substantially parallel with an installation plane. The table unit 14*e* in the stowage position is folded against the seat component 12*e* and cannot be utilized for placing items.

The table device comprises a locking module 20*e*. The locking module 20*e* is configured for fixing the table unit 14*e* in the stowage position thereof on the seat component 12*e*. The locking module 20*e* has a locked state in which said locking module 20*e* locks the table unit 14*e* in the stowage position thereof. The locking module 20*e* has an unlocked state in which said locking module 20*e* releases the table unit 14*e* so that the latter can be moved out of the stowage position. The locking module 20*e* is in particular configured for fixing the table unit 14*e* to the seat component 12*e* such that the table unit 14*e* is securely fixed to the seat component 12*e* even in the event of a crash. To this end, the locking module 20*e* is configured for coupling the table unit 14*e* to the seat component 12*e* in a plurality of positions. The locking module 20*e* is in particular configured for coupling the table unit 14*e* to the seat component 12*e* in two opposite peripheral regions 22*e*, 24*e*.

The locking module 20*e* has an attachment unit 28*e*. The attachment unit 28*e* is fixedly connected to the seat component 12*e*. In principle, it is also conceivable that the attachment unit 28*e* is at least partially or completely implemented by the seat component 12*e*. The attachment unit 28*e* has a housing 30*e*. The housing 30*e* is formed by a base body. The housing 30*e* is formed by a base shell and a cover plate. The housing 30*e* defines an internal space 32*e*. The internal space 32*e* of the housing 30*e* of the attachment unit 28*e* is provided so that components of the locking module 20*e* are disposed and/or supported in said internal space 32*e*. The attachment unit 28*e* is rigidly connected to the seat component 12*e*. The attachment unit 28*e* is provided so that the table unit 14*e* in the stowage position thereof is able to be attached to the attachment unit 28*e*. The attachment unit 28*e* is at least in part disposed above the table unit 14*e*. The attachment unit 28*e* in the stowage position of the table unit 14*e* is disposed above the table unit 14*e*. Part of the attachment unit 28*e* in the stowage position of the table unit 14*e* is disposed between the table unit 14*e* and the seat component 12*e*.

The table unit 14*e* in the stowage position thereof is lockable to the attachment unit 28*e*. The table unit 14*e* is able to be fixedly locked to the seat component 12*e* by way of the attachment unit 28*e* which is fixedly connected to the seat component 12*e*. The locking module 20*e* comprises two form-fit elements 34*e*, 36*e*. The form-fit elements 34*e*, 36*e* are configured for attaching in a form-fitting manner the table unit 14*e* to the attachment unit 28*e*. The table unit 14*e* in the locked state is coupled in a form-fitting manner to the attachment unit 28*e* by means of the form-fit elements 34*e*, 36*e*. The form-fit elements 34*e*, 36*e* are disposed in outer peripheral regions of the attachment unit 28*e*, said outer peripheral regions being in each case disposed so as to be congruent with one of the outer peripheral regions 22*e*, 24*e* of the table unit 14*e*. The form-fit elements 34*e*, 36*e* are of substantially identical implementation, which is why only the form-fit element 34*e* will be described in more detail hereunder. The form-fit element 34*e* has a base body 140*e*. The base body 140*e* has a recess 142*e*. The form-fit element 34*e* comprises a pivotably supported latching element 144*e*. The latching element 144*e* is pivotably supported in the base body 140*e*. The latching element 144*e* in a locked position of the form-fit element 34*e* is configured for at least substantially closing the recess 142*e*. The latching element 144*e* in a release position of the form-fit element 34*e* is configured for being moved out of a region of the recess 142*e* so as to release the latter.

The locking module 20*e* for coupling in a form-fitting manner to the form-fit elements 34*e*, 36*e* that are disposed in the attachment unit 28*e* has two form-fit elements 38*e*, 40*e* which are fixedly connected to the table unit 14*e*. The form-fit elements 38*e*, 40*e* of the table unit 14*e* are implemented so as to correspond to the form-fit elements 34*e*, 36*e* of the attachment unit 28*e*. The form-fit elements 38*e*, 40*e* are implemented by the articulation elements 46*e* of the support unit 138*e*. The form-fit elements 38*e*, 40*e* implemented by the articulation elements 46*e* are configured for latching in the corresponding recess 142*e* behind the respective latching element 144*e* of the corresponding form-fit element 34*e*, 36*e*. When pivoting the table unit 14*e* to the stowage position thereof, the form-fit elements 38*e*, 40*e* implemented by the articulation element 46*e* automatically latch in the form-fit elements 34*e*, 36*e*. In order for the form-fit elements 34*e*, 36*e* to be able to come into a form-fitting contact with the form-fit elements 38*e*, 40*e* implemented by the articulation elements 46*e*, the base body 88*e* has in each case one recess 146*e* at the bearing locations. On account thereof, the table unit 14*e* can be implemented in a particularly simple manner, and the attachment principle, in particular the form-fitting elements 38*e*, 40*e*, can be integrated in a simple manner in existing table units 14*e*.

The locking module 20*e* comprises an actuation mechanism 42*e*. The actuation mechanism 42*e* is configured for an actuation of the form-fit elements 34*e*, 36*e*. The actuation mechanism 42*e* is configured for pivoting the latching elements 144*e* of the form-fit elements 34*e*, 36*e* and on account thereof adjusting the form-fit elements 34*e*, 36*e* between a release position and a locked position. The actuation mechanism 42e is disposed in the attachment unit 28e. The actuation mechanism 42e is configured for transmitting an actuation movement exerted thereon to the two form-fit elements 34e, 36e so as to actuate the latter, in particular so as to move said form-fit elements 34e, 36e from the locked position thereof to the release position thereof. The actuation mechanism 42e comprises a rotation element 100e. The rotation element 100e is realized as a torsion bar. The rotation element 100e is rotatably supported in the internal space 32e of the housing 30e. The rotation element 100e runs in a transverse direction. The rotation element 100e extends between the two peripheral regions of the attachment unit 28e. The rotation element 100e extends from the one form-fit element 34e of the attachment unit 28e up to the opposite form-fit element 36e of the attachment unit 28e. In principle, it is also conceivable that the locking module 20e has two rotation elements, wherein one rotation element extends in each case from a form-fit element 34e, 36e up to a central region of the attachment unit 28e. The rotation element 100e at the ends thereof is in each case coupled to the latching element 144e of the corresponding form-fit element 34e, 36e. The rotation element 100e is in each case coupled in a form-fitting manner to the latching element 144e of the corresponding form-fit element 34e, 36e. The latching elements 144e herein are directly connected in a form-fitting manner to the rotation element 100e. The coupling of the latching elements 144e of the corresponding form-fit element 34e, 36e to the rotation element 100e is configured for converting rotation movement of the rotation element 100e to a pivot movement of the latching elements 114e of the form-fit elements 34e, 36e.

The locking module 20e comprises an actuation element 60e. The actuation element 60e is configured for manual operation by a passenger. The actuation element 60e is configured for adjusting the locking module 20e between the unlocked position thereof and the locked position thereof. The actuation element 60e is embodied as a pivotable lever element. The actuation element 60e is attached to the attachment unit 28e. The actuation element 60e is attached so as to be centric on the attachment unit 28e. The actuation element 60e when actuated is configured for rotating the rotation element 100e. The locking module 20e for coupling to the rotation element 100e has a coupling mechanism 102e. The coupling mechanism 102e has a lever element by means of which the movement of the actuation element 60e is transmitted to the rotation element 100e.

Figure 17:
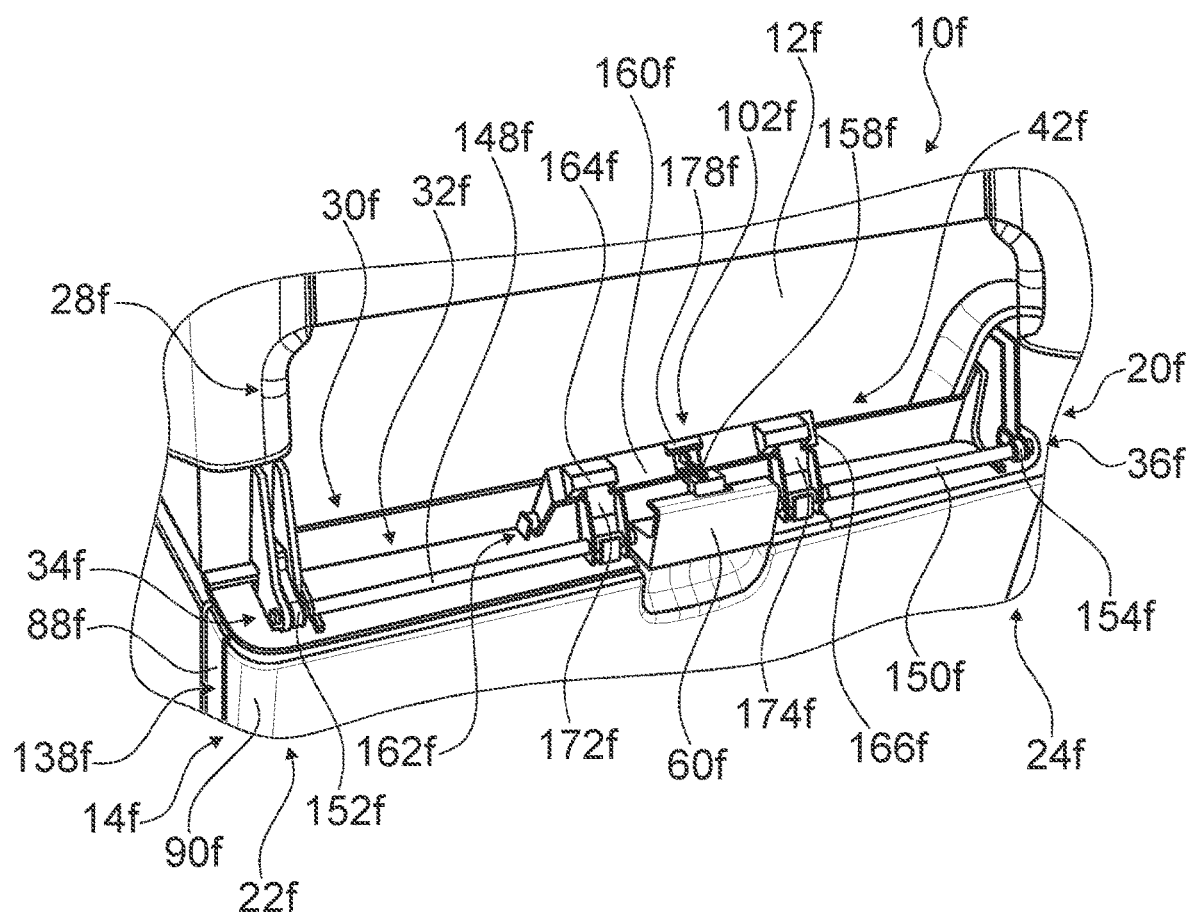
FIG. 17 shows a schematic illustration of a table device in a sixth exemplary embodiment, having a table unit in a stowage position and a locking module in a locked state, and having a safety module.
Figure 18:
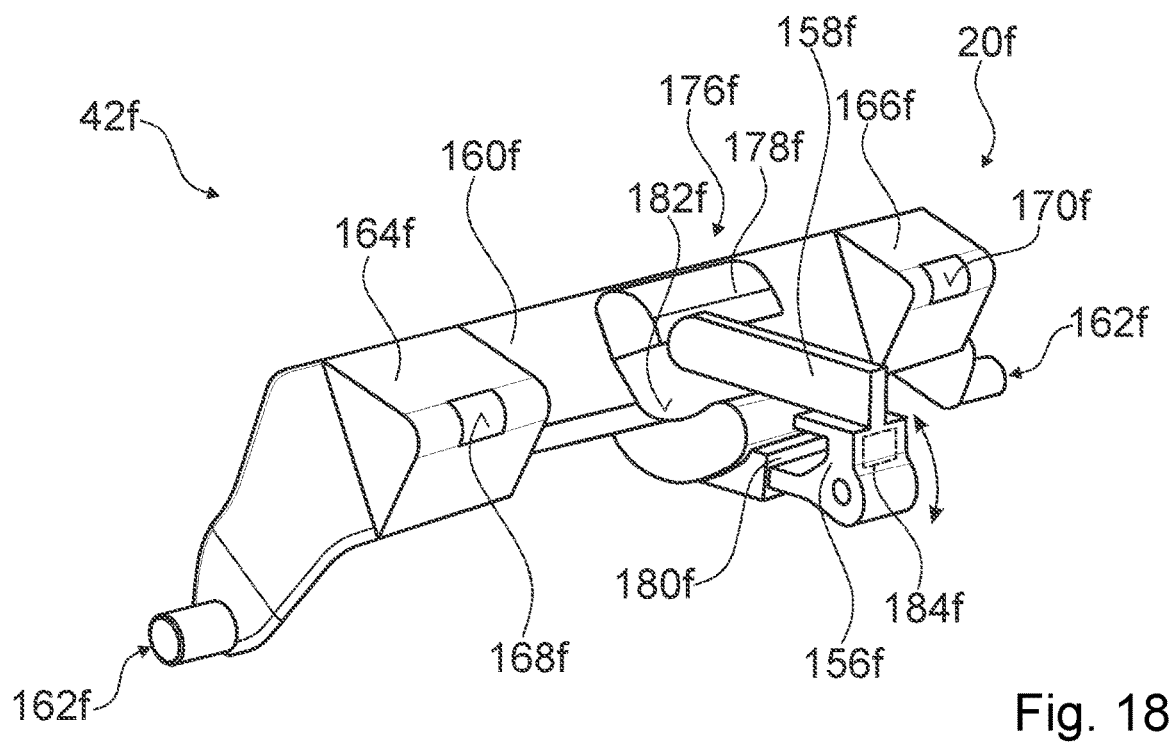
FIG. 18 shows a schematic detailed illustration of the safety module of the table device in the sixth exemplary embodiment.

FIGS. 17 and 18 show a table device for a seat 10f in a sixth exemplary embodiment. The seat 10f has a seat component 12f. The seat component 12f is realized as a back rest. The table device comprises a table unit 14f. The table unit 14f is implemented by two mutually pivotable base bodies 88f, 90f. The table device has a support unit 138f by way of which the two base bodies 88f, 90f are pivotably connected to one another. The support unit 138f has two bearing locations where the two base bodies 88f, 90f are pivotably connected to one another. The support unit 138f at the bearing locations per base body 88f, 90f has one articulation element which is connected to the respective base body 88f, 90f. The base bodies 88f, 90f in a folded-out state implement a table surface. The table unit 14f is of substantially identical implementation as in the fifth exemplary embodiment in FIGS. 15 and 16.

The table device comprises a locking module 20f. The locking module 20f in terms of the fundamental construction is implemented similarly to the locking module of the fifth exemplary embodiment in FIGS. 15 and 16. The locking module 20f is configured for fixing the table unit 14f in the stowage position thereof on the seat component 12f. The locking module 20f has a locked state in which said locking module 20f locks the table unit 14f in the stowage position thereof. The locking module 20f has an unlocked state in which said locking module 20f releases the table unit 14f such that the latter can be moved out of the stowage position. The locking module 20f is in particular configured for fixing the table unit 14f on the seat component 12f such that the table unit 14f is securely fixed on the seat component 12f even in the event of a crash. To this end, the locking module 20f is configured for coupling the table unit 14f to the seat component 12f in a plurality of positions. The locking module 20f is in particular configured for coupling the table unit 14f to the seat component 12f in two opposite peripheral regions 22f, 24f.

The locking module 20f has an attachment unit 28f. The attachment unit 28f is fixedly connected to the seat component 12f. The attachment unit 28f has a housing 30f. The housing 30f defines an internal space 32f. The internal space 32f of the housing 30f of the attachment unit 28f is provided so that components of the locking module 20f are disposed and/or supported in said internal space 32f. The attachment unit 28f is provided so that the table unit 14f in the stowage position thereof is able to be attached to the attachment unit 28f.

The table unit 14f in the stowage position thereof is lockable to the attachment unit 28f. The table unit 14f is able to be fixedly locked to the seat component 12f by way of the attachment unit 28f which is fixedly connected to the seat component 12f. The locking module 20f comprises two form-fit elements 34f, 36f. The form-fit elements 34f, 36f are configured for attaching in a form-fitting manner the table unit 14f to the attachment unit 28f. The form-fit elements 34f, 36f are disposed in outer peripheral regions of the attachment unit 28f, said peripheral regions being in each case disposed so as to be congruent with an outer peripheral region 22f, 24f of the table unit 14f. The form-fit elements 34f, 36f are of substantially identical implementation as the corresponding form-fit elements of the fifth exemplary embodiments of FIGS. 15 and 16, which is why the form-fit elements 34f, 36f are not to be described in more detail hereunder. Respectively correspondingly implemented form-fit elements of the attachment unit 28f which are fixedly connected to the table unit 14f and in the locked state are configured for coupling to the form-fit elements 34f, 36f are likewise implemented so as to be identical to those of the fifth exemplary embodiment of FIGS. 15 and 16, which is why a description is also dispensed with hereunder.

The locking module 20f comprises an actuation mechanism 42f. The actuation mechanism 42f is configured for an actuation of the form-fit elements 34f, 36f. The actuation mechanism 42f is configured for pivoting latching elements (not illustrated in more detail) of the form-fit elements 34f, 36f and on account thereof adjusting the form-fit elements 34f, 36f between a release position and a locked position. The actuation mechanism 42f is disposed in the attachment unit 28f. The actuation mechanism 42f is configured for transmitting an actuation movement exerted thereon to the two form-fit elements 34f, 36f so as to actuate the latter, in particular so as to move said form-fit elements 34f, 36f from the locked position thereof to the release position thereof.

The actuation mechanism 42f comprises two rotation elements 148f, 150f. The rotation elements 148f, 150f are in each case embodied as a torsion bar. The rotation elements 148f, 150f are rotatably supported in the internal space 32f of the housing 30f. The rotation elements 148f, 150f run in a transverse direction. In each case one of the rotation elements 148f, 150f is in each case configured for transmitting an actuation movement to one of the form-fit elements 34f, 36f. The rotation elements 148f, 150f extend in each case between one of the two peripheral regions of the attachment unit 28f into a central region. The actuation mechanism 42f comprises two coupling elements 152f, 154f which are in each case attached in a rotationally fixed manner to an outer end of one of the two rotation elements 148f, 150f. The coupling elements 152f, 154f couple the rotation elements 148f, 150f in each case to the corresponding form-fit element 34f, 36f and convert a rotating movement of the respective rotation element 148f, 150f to a corresponding movement of the latching element of the corresponding form-fit element 34f, 36f.

The locking module 20f comprises an actuation element 60f. The actuation element 60f is configured for manual operation by a passenger. The actuation element 60f is configured for adjusting the locking module 20f between the unlocked position thereof and the locked position thereof. The actuation element 60f is implemented as a pivotable lever element. The actuation element 60f is attached to the attachment unit 28f. The actuation element 60f is attached so as to be centric on the attachment unit 28f. The actuation element 60f when actuated is configured for rotating the rotation elements 148f, 150f. The actuation element 60f herein is in particular not directly coupled to the rotation elements 148f, 150f.

The locking module 20f for coupling to the rotation elements 148f, 150f has a coupling mechanism 102f. The coupling mechanism 102f has a lever element 156f by means of which the movement of the actuation element 60f is transmitted to the rotation element 100f. The lever element 156f is connected in a rotationally fixed manner to the actuation element 60f. In principle, it would also be conceivable that the lever element 156f is implemented integrally with the actuation element 60f. In principle, it is likewise conceivable that the lever element 156f is at least in part implemented so as to be movable in relation to the actuation element 60f, a minimal movement between the two elements thus being possible. The lever element 156f comprises an actuation lever 158f shaped in an elongate manner. In principle, it is also conceivable that the lever element 156f has two or more actuation levers 158f which are disposed beside one another and are of substantially identical implementation. The actuation lever 158f extends in the direction of the actuation mechanism 42f. The actuation lever 158f is implemented integrally with the lever element 156f. The actuation lever 158f is configured for transmitting a pivot movement of the lever element 156f, thus a pivot movement of the actuation element 60f.

The coupling mechanism 102f comprises a deflection element 160f. The deflection element 160f is configured for transmitting a movement of the lever element 156f to the rotation elements 148f, 150f. The deflection element 160f is disposed in a central region of the attachment unit 28f. The deflection element 160f is in particular disposed so as to be central in the attachment unit 28f. The deflection element 160f is disposed so as to be centric between the external edges of the table unit 14f. The deflection element 160f is in particular disposed directly at the actuation element 60f and the lever element 156. The deflection element 160f is substantially shaped like a clothes hanger. The deflection element 160f is pivotably supported in the internal space 32f of the housing 30f. The deflection element 160f implements bearing bolts 162f by way of which the deflection elements 160f, by way of receptacles (not illustrated in more detail) in the internal space 32f of the housing 30f is pivotably supported by way of a bearing, preferably a slide bearing. The two bearing bolts 162f are in particular disposed on opposite sides of the actuation element 60f. The deflection element 160f has two transmission means 164f, 166f. The transmission means 164f, 166f are configured for transmitting a pivot movement of the deflection element 160f to in each case one of the rotation elements 148f, 150f. The transmission means 164f, 166f are disposed on opposite sides of the actuation element 60f. The transmission means 164f, 166f are in each case disposed in an end of the respective rotation element 148f, 150f that is disposed in the central region. The transmission means 164f, 166f are in each case implemented as transmission elevations. The transmission means 164f, 166f implemented as transmission elevations form in each case one contact face 168f, 170f. The contact faces 168f, 170f are implemented so as to be concave. In principle, it would also be conceivable that the transmission means 164f, 166f are implemented by rotatably supported roller bearings or rollers, wherein the contact faces 168f, 170f would be formed by the rotatable external faces of the roller bearings. The coupling mechanism 102f per rotation element 148f, 150f has one lever 172f, 174f which is connected in a rotationally fixed manner to the respective rotation element 148f, 150f. The levers 172f, 174f are configured for transmitting the movement from the deflection element 160f to the respective rotation elements 148f, 150f. The levers 172f, 74f are in contact with the contact faces 168f, 170f of the transmission means 164f, 166f of the deflection element 160f. The contact faces 168f, 170f of the transmission means 164f, 166f are disposed so as to be eccentric to the rotation axis of the bearing bolts 162f about which the deflection element 160f is pivoted when actuated. The deflection element 160f for receiving the movement of the lever element 156f has a contact face 182f. The contact face 182f is implemented by the deflection element 160f. The contact face 182f is implemented so as to be concave. In principle, it would also be conceivable that the contact face 182f is implemented by a roller element. The contact face 182f is disposed in the region of the lever element 156f. The contact face 182f is configured for contact with the actuation lever 158f of the lever element 156f. When pivoting the lever element 156f on account of an actuation of the actuation element 60f, the actuation lever 158f comes into contact with the contact face 182f, rolls on the latter, and thus exerts a force on the deflection element 160f, on account of which the deflection element 160f pivots about the bearing axis formed by the bearing bolt 162f. On account of the pivoting of the deflection element 160f from a locking orientation to an unlocking orientation, the levers 172f, 174f which are connected in a rotationally fixed manner to in each case one of the rotation elements 148f, 150f are deflected outward, and the respective rotation element 148f, 150f on account thereof is rotated for unlocking the form-fit elements 34f, 36f.

The locking module 20f comprises a safety device 176f. The safety device 176f is configured for preventing any unintentional unlocking of the table unit 14f. The safety device 176f is in particular configured for preventing any unlocking of the table in the event of overloading. The safety device 176f is in particular configured for preventing any unlocking of the locking module 20f and on account thereof of the table unit 14f in the event of overloading in which particularly high acceleration forces act on the seat 10 and the table device, for example on account of an impact of a passenger or of a crash test dummy during a crash test (HIC test). The safety device 176f is integrated in the coupling mechanism 102f. The safety device 176f is in particular configured for preventing a movement of the lever element 156f caused by the acceleration arising during the overloading and acting on the table device. The lever element 156f, on account of the mass inertia thereof and the movement which a crash test dummy hitting the table device would introduce, in the event of a high acceleration in a sitting direction of the seat 10f (for example in the case of a HIC test [impact test using crash test dummies hitting the back rest of the seat]) would move in the direction of the deflection element 160f. This movement, and potential unlocking of the table resulting therefrom by a pivoting of the deflection element 160f, is prevented by the safety device 176f. An engagement of the actuation lever 158f of the lever element 156f in the contact face 182f of the deflection element 160f and a consequential pivoting of the deflection element 160f is in particular prevented by the safety device 176f. The safety device 176f is in particular implemented by the deflection element 160f. The safety device 176f has two blocking elements 178f, 180f. The blocking elements 178f, 180f are implemented as elevations on the deflection element 160f, in particular in the region of the lever element 156f. The first blocking element 178f is implemented as an upper blocking element 178f. The upper blocking element 178f is disposed in the region of the actuation lever 158f. The blocking element 178f is disposed above the contact face 182f of the deflection element 160f. The actuation lever 158f of the lever element 156f in a locked position of the locking module 20f bears on the blocking element 178f. In principle, it would be conceivable that the actuation lever 158f of the lever element 156f has a small spacing from the blocking element 178f. In a state of normal operation, the actuation lever 158f when pivoting on account of an actuation of the actuation element 60f pivots past the blocking element 178f. The second blocking element 180f is implemented as a lower blocking element 180f. The lower blocking element 180f is disposed in a lower region of the lever element 156f. The blocking element 180f is disposed below the contact face 182f of the deflection element 160f. The lever element 156f in the locked position of the locking module 20f bears on the blocking element 180f. In principle, it would be conceivable that the lever element 156f has a small spacing from the blocking element 180f. In a state of normal operation, the lever element 156f when pivoting on account of an actuation of the actuation element 60f pivots past the blocking element 180f. In the event of overloading with intense acceleration, the lever element 156f is accelerated in the direction of the deflection element 160f. On account thereof, the actuation lever 158f of the lever element 156f is pushed against the blocking element 178f, and a lower region of the lever element is pushed against the blocking element 180f. The lever element 156f is blocked and cannot rotate on account of the actuation lever 158f of the lever element 156f and the lower region of the lever element 156f impacting the respective blocking element 178f, 180f. On account thereof, the actuation lever 158f in the event of overloading can in particular not come into contact with the contact face 182f of the deflection element 160f. On account thereof, any unlocking of the table unit 14f in the event of overloading can in particular be prevented.

In principle, it would be likewise conceivable that the locking module 20f comprises a differently implemented actuation element 184f. It is particularly conceivable herein that the locking module 20f, instead of the actuation element 60f implemented as a pivotable lever element, comprises an actuation element 184f implemented as a compression element. An actuation element 184f implemented as a compression element herein could in particular be integrated in the locking module 20f at the locations indicated by dashed lines in FIG. 18. The actuation element 184f implemented as a push button herein would exert an axial movement on the lever element 156f and on account thereof induce a rotation of the lever element 156f. In principle, it would be likewise conceivable that the actuation element is implemented as a pivotable lever which is rotatable about an axis which is orthogonal to the rotation elements 148f, 150f and herein actuates the locking module 20f by way of a gate guide or similar.

The invention claimed is:

1. A table device for a seat, in particular for an aircraft seat, comprising:
    a table unit which is configured for being adjustable at least between a use position and a stowage position, and
    at least one locking module which has at least one attachment unit which is configured for being at least in part fixedly connected to a seat component,
    wherein the table unit at least in the stowage position is lockable to the attachment unit,
    wherein the locking module has at least two force-fit and/or form-fit elements by means of which the table unit in a locked state is coupled in a form-fitting and/or force-fitting manner to the attachment unit,
    wherein the locking module has an actuation mechanism which is disposed at least substantially in the attachment unit and is configured for an actuation of the force-fit and/or form-fit elements,
    wherein the locking module has at least one actuation element which is configured for manual operation by a passenger and is attached to the table unit, the actuation element including at least one force-fit and/or form-fit element by means of which the table unit in a locked state is coupled in a form-fitting and/or force-fitting manner to the attachment unit, and
    wherein the force-fit and/or form-fit elements are configured for being adjusted between a release position, in which the force-fit and/or form-fit elements are disposed at least substantially in the attachment unit, and a locked position, in which the force-fit and/or form-fit elements at least in part engage in a form-fitting manner in the table unit.

2. The table device as claimed in claim 1, wherein the actuation element when coupling to the attachment unit is configured for initiating a relative movement of the table unit and the attachment unit.

3. The table device as claimed in claim 1, wherein the actuation element when coupling to the attachment unit is configured for an actuation of the actuation mechanism.

4. The table device as claimed in claim 1, wherein the force-fit and/or form-fit elements are configured for locking the table unit by way of a friction fit and, in the event of a force in an opening direction of the table unit, for increasing the friction fit by way of self-reinforcement.

5. The table device as claimed in claim 1,
    wherein the force-fit and/or form-fit elements are disposed in the table unit and for locking the table unit are configured for being in each case at least substantially encompassed by at least one form-fit element disposed in the attachment unit, and
    wherein the form-fit element disposed in the attachment unit for unlocking is supported so as to be elastically deflectable and/or movable.

6. The table device as claimed in claim 5, wherein the locking module has at least one unlocking element which for unlocking the force-fit and/or form-fit elements is configured for elastically deforming and/or moving the form-fit elements at least in part.

7. The table device as claimed in claim 1, wherein the force-fit and/or form-fit elements are configured for coupling the table unit to the attachment unit by way of a force-fitting and/or form-fitting connection that is releasable in an opening direction of the table unit.

8. The table device as claimed in claim 1, wherein the locking module has an actuation mechanism which comprises at least one lever element which is configured for actively pushing or pulling at least one of the force-fit and/or form-fit elements out of a locked position.

9. The table device as claimed in claim 1,
wherein the table unit is implemented of at least two base bodies which are pivotably connected to one another by way of at least one support unit and which to this end have at least one articulation element which is embodied as a bearing pin, and
wherein the force-fit and/or form-fit elements implemented by the table unit are implemented by the articulation element.

10. A seat, in particular an aircraft seat, having at least one seat component, in particular a seat component realized as a back rest, and having a table device as claimed in claim 1.

11. The seat as claimed in claim 10,
wherein the seat component implements a storage region, in particular a high literature pocket,
wherein the table device has an attachment unit realized as a back rest bridge, and
wherein an opening implementing a fill-in opening of the storage region is disposed between the attachment unit and the seat component.

12. A table unit having a table device as claimed in claim 1.

13. A table device for a seat, in particular for an aircraft seat, comprising:
a table unit which is configured for being adjustable at least between a use position and a stowage position, and
at least one locking module which has at least one attachment unit which is configured for being at least in part fixedly connected to a seat component,
wherein the table unit at least in the stowage position is lockable to the attachment unit, wherein the locking module has at least two force-fit and/or form-fit elements by means of which the table unit in a locked state is coupled in a form-fitting and/or force-fitting manner to the attachment unit,
wherein the table unit is implemented of at least two base bodies which are pivotably connected to one another by way of at least one support unit and which to this end have at least one articulation element which is embodied as a bearing pin, wherein the force-fit and/or form-fit elements implemented by the table unit are implemented by the articulation element,
wherein two of the form-fit elements are disposed in the attachment unit and two of the form-fit elements are fixedly connected to the table unit,
wherein the form-fit elements disposed in the attachment unit each comprise a pivotably supported latching element, and
wherein the form-fit elements of the table unit are implemented so as to correspond to the form-fit elements of the attachment unit.

* * * * *